(12) United States Patent
Mochizuki

(10) Patent No.: US 7,505,108 B2
(45) Date of Patent: Mar. 17, 2009

(54) LIQUID CRYSTAL MATERIAL FILLING METHOD AND LIQUID CRYSTAL MATERIAL FILLING APPARATUS

(75) Inventor: Akihiro Mochizuki, Louisville, CO (US)

(73) Assignee: Nano Loa, Inc., Kanagawa (JP)

( * ) Notice: Subject to any disclaimer, the term of this patent is extended or adjusted under 35 U.S.C. 154(b) by 0 days.

(21) Appl. No.: 10/932,018

(22) Filed: Sep. 2, 2004

(65) Prior Publication Data
US 2006/0044508 A1    Mar. 2, 2006

(51) Int. Cl.
*G02F 1/1339*   (2006.01)
(52) U.S. Cl. .................... 349/153; 349/189
(58) Field of Classification Search .......... None
See application file for complete search history.

(56) References Cited
U.S. PATENT DOCUMENTS

| | | | |
|---|---|---|---|
| 5,037,185 A * | 8/1991 | Grupp | ........................ 349/195 |
| 5,511,591 A * | 4/1996 | Abe | ............................... 141/7 |
| 5,978,065 A * | 11/1999 | Kawasumi et al. | .......... 349/188 |
| 6,531,329 B2 * | 3/2003 | Asakura et al. | ................ 438/30 |
| 2004/0008316 A1 * | 1/2004 | Eguchi et al | ................. 349/189 |
| 2004/0160566 A1 | 8/2004 | Kawabe et al. | |

FOREIGN PATENT DOCUMENTS

| | | |
|---|---|---|
| JP | 2001066612 | 3/2001 |
| JP | 2002122870 | 4/2002 |
| JP | 2003222883 | 8/2003 |
| JP | 2003315810 | 11/2003 |
| JP | 2003344863 | 12/2003 |

\* cited by examiner

*Primary Examiner*—David Nelms
*Assistant Examiner*—Lucy P Chien
(74) *Attorney, Agent, or Firm*—Morrison & Foerster LLP

(57) ABSTRACT

A method of injecting liquid crystal material, which is capable of efficiently injecting a liquid crystal material having a high viscosity at room temperature, such as smectic-phase liquid crystal material while maintaining a high throughput, a seal pattern that can be preferably used for the method, and an apparatus for injecting liquid crystal material.

8 Claims, 11 Drawing Sheets

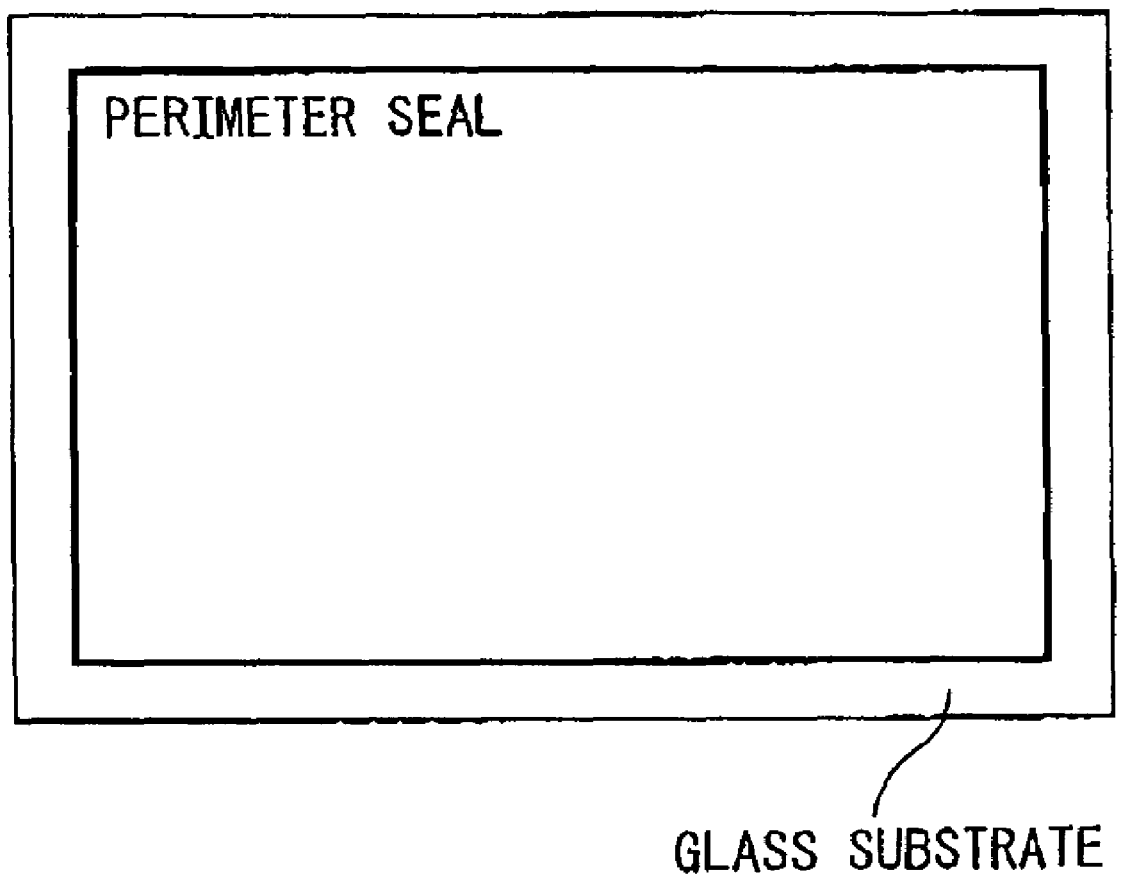

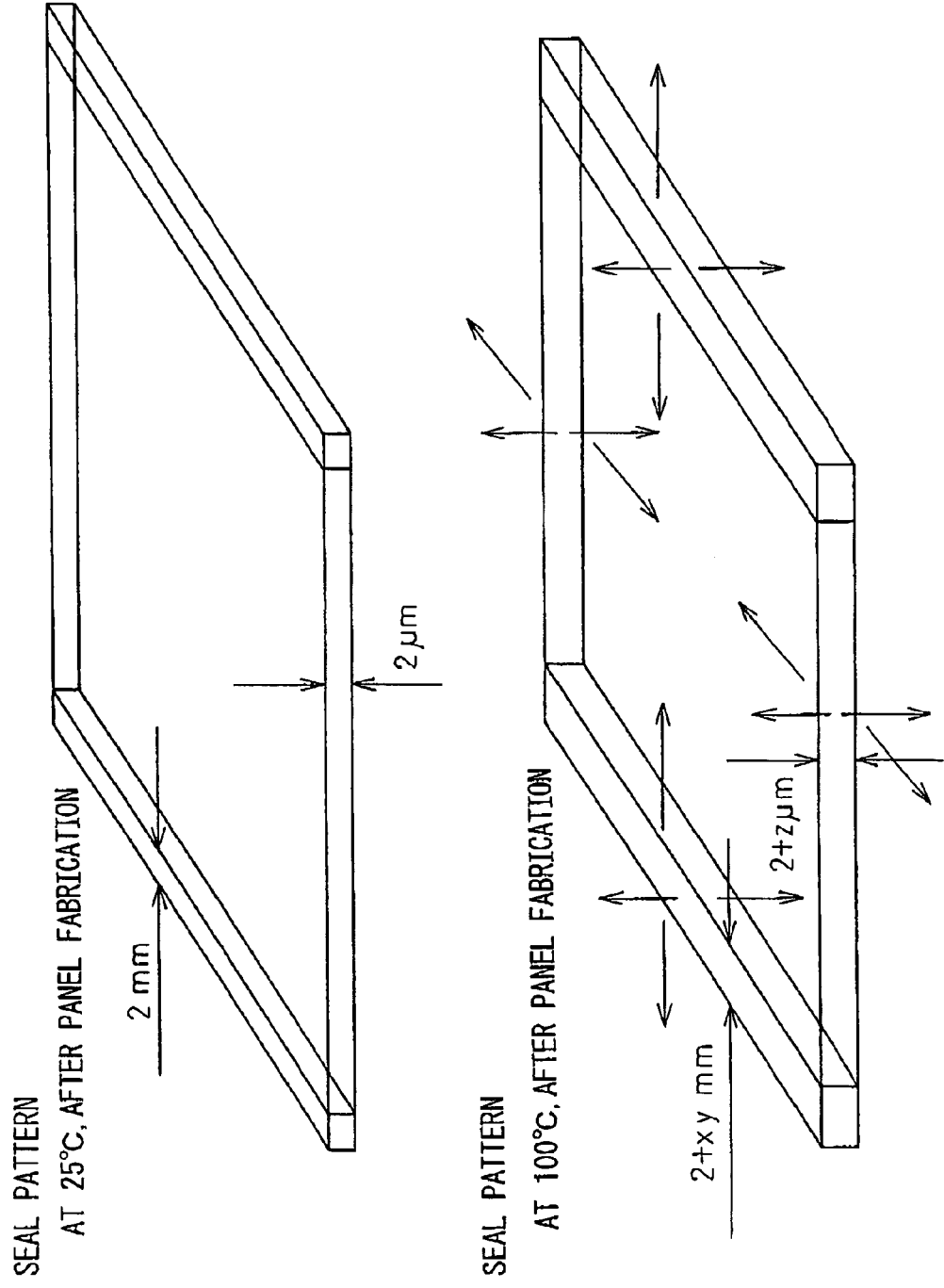

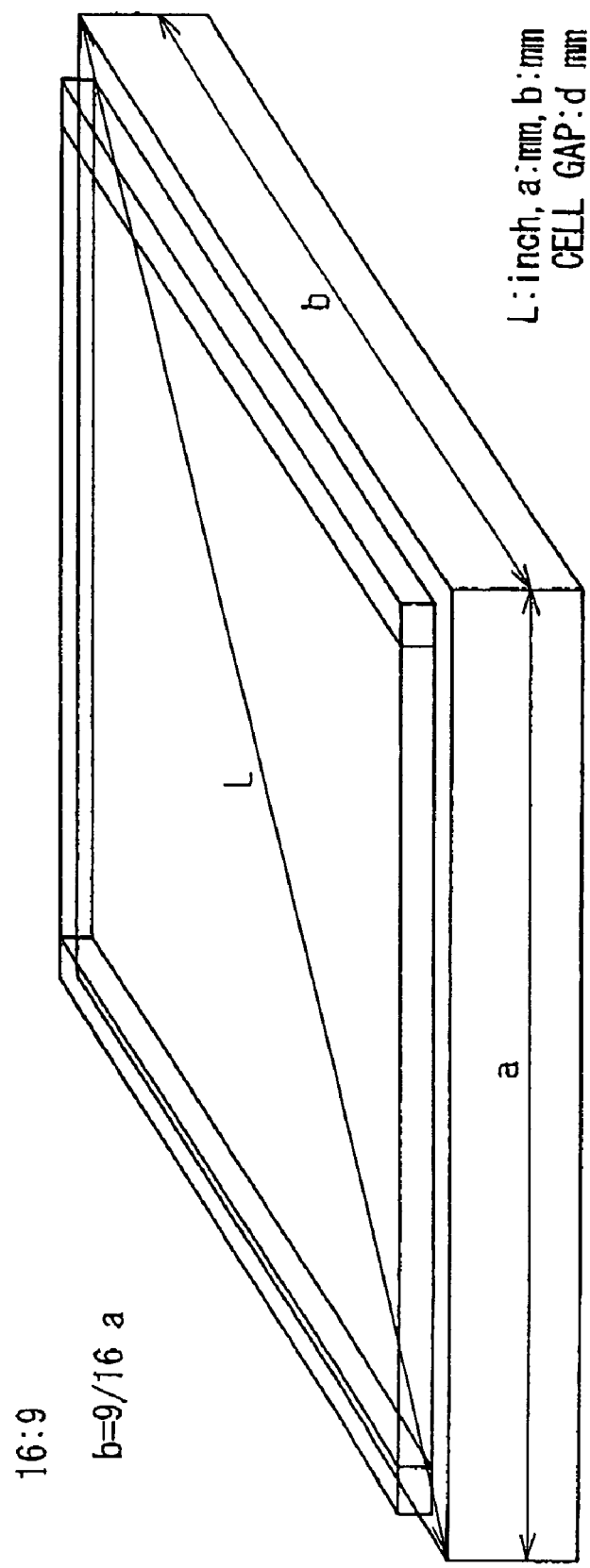

LIQUID CRYSTAL MATERIAL FILLING METHOD AND LIQUID CRYSTAL MATERIAL FILLING APPARATUS

BACKGROUND OF THE INVENTION

1. Field of the Invention

The present invention relates to a method of injecting a liquid crystal material, which is capable of effectively and reliably injecting a liquid crystal material (such as smectic liquid crystal material) which so far could be injected with great difficulty or which could not be substantially injected at room temperature, and to an apparatus for injecting the liquid crystal material.

2. Related Background Art

Recent emerging development of liquid crystal display (LCD) devices for the TV application is outstanding. On the other hand, this new application of LCDs for TV, at the same time, requires a higher display performance than that which has ever been used in the field of LCDs.

For example, highly viscous liquid crystal materials for providing smectic liquid crystals can potentially realize a high image quality which is required for the TV application. However, due to the high viscosity of the smectic liquid crystal materials, the filling of a liquid crystal material to a panel comprising a pair of substrates (in particular, to a large screen TV panel) has still some critical problems. Although the ODF (One Drop Filling) technique is being used for filling large screen panels with conventional nematic liquid crystal materials, it is extremely difficult to fill a panel with a highly viscous smectic liquid crystal material by using the ODF technique. Accordingly, the filling of such a highly viscous smectic liquid crystal material needs an innovative filling method, in order to realize a practically effective liquid crystal material filing method for the smectic liquid crystal materials.

More specifically, the recent rapid development of the liquid crystal display technology has enabled the application of the LCDs to large screen TVs. This development has also been applied to large computer monitors such as 15-inch, 17-inch and over 20-inch diagonal screens. This rapid increase in the screen size has requested a new liquid crystal manufacturing method. Particularly, it is inevitable to improve the liquid crystal filling method. The conventional liquid crystal filling method that is known as the pressure deference method utilizing a pressure deference between vacuum and standard atmosphere consumes a lot of excess amount of liquid crystal, in particular for large panels. Moreover, the pressure difference method takes long time to fill large panels, which makes manufacturing throughput very low.

The ODF method introduced for large panel fillings requires minimum amount of liquid crystal material and much shorter filling time than conventional pressure difference method. Therefore, the ODF method is more popular than ever, in particular for the method of filling a large screen panel (such as one having a size of 30 inches or more).

More specifically, in the conventional method, a liquid crystal material is injected to an injection hole, which is preliminarily provided in a pre-bonded glass substrates. On the other hand, in this ODF methods a liquid crystal material is dropped on a lower glass substrate before the bonding, and then this lower glass substrate is covered with an upper glass substrate so as to provide a bonded glass substrates in one step. It is said that the number of the manufacturing steps and the gap (cell gap) between the glass substrates can be reduced by adopting such an ODF method. Particularly, in the case of twisted nematic (TN) LCDs, which are most popular in the LCD fabricating industry at present, the reduction in the cell gap can have a most significant effect on an increase in the decay time (or on a decrease in the liquid crystal response time).

On the other hand, requirement for large panel screen in LCD-TVs needs higher performance liquid crystal display mode than that of widely used TN (Twisted Nematic) LCDs. TN-LCDs have significant limitation in their optical response time and viewing angle, which are most required for TV or large-size TV image quality.

In order to overcome requirement for TV image quality, several nematic liquid crystal based LCD modes are being developed as well as smectic liquid crystal based LCD modes. Particularly, a smectic liquid crystal display is expected to be one of the most promising technologies to meet with the response speed, which is the last unsolved technical problem in the LCDs.

However, a smectic liquid crystal material generally has a very high viscosity such as that of wax-like material, it is almost impossible to apply the ODF method to the smectic liquid crystal materials. It is highly requested to establish innovative filling method which enables highly viscous smectic liquid crystal materials to fill large screen panels with effective manufacturing throughput, because the smectic liquid crystal material can provide a high-speed response suitable for large LCDs, particularly TVs.

In general, the following two liquid crystal filling methods are well known for a large screen panel manufacturing.

(1) Pressure difference method
(2) ODF method

In the pressure difference method, a liquid crystal panel and liquid crystal material are set in the vacuum chamber. Air in the liquid crystal panel is sack up, then, the fill hole of the liquid crystal panel is touched with liquid crystal material, resulting in being covered by liquid crystal material. After the fill hole is covered by the liquid crystal material, the pressure in the vacuum chamber is gradually recovered to the atmospheric pressure. When the pressure in the vacuum chamber is recovered to the atmospheric pressure, the liquid crystal material is pushed into the interior of the panel due to the pressure difference between the interior of the liquid crystal panel (reduced pressure) and the chamber.

In the ODF method, a pre-formed perimeter seal pattern is provided on one of the two glass substrates, before the glass substrates are formed into a panel. A precisely measured amount of a liquid crystal material is dropped on the substrate having thereon the pre-formed perimeter seal pattern. Then, the other substrate of the two glass substrates is laminated on the above substrate to complete panel fabrication.

It is clear that the ODF method is much more effective than the pressure difference method in terms of volume manufacturing. Because of its liquid crystal dropping method, the ODF method is very effective for low viscous nematic liquid crystal materials. The dropped liquid crystal material on the pre-formed perimeter seal substrate is easily propagated to all over the substrate by the given pressure from laminated the other substrate.

On the contrary, highly viscous smectic liquid crystal material is not easy to propagate to all over the panel by the lamination pressure due to its high viscosity. Elevated temperature helps to reduce viscosity of the smectic liquid crystal materials, and makes uniform propagation to all over the substrate.

One of the problems of this temperature increase is volume expansion of materials. At the isotropic temperature such as 100° C., the viscous smectic liquid crystal material at room temperature shows low viscosity. This low viscosity effectively spreads out the liquid crystal material to all over the panel. After the liquid crystal is filled at the high temperature, the liquid crystal material is filled to all over the panel whose volume is expanded by high temperature. However, when the temperature is recovered to the room temperature, the volume of the liquid crystal material is decreased, so as to create bubbles in the panel.

Accordingly, when the temperature is elevated so as to provide a low viscosity of the liquid crystal material, such a method is not effective for the production of LCD panels.

As described above, it is eagerly desired to establish a method of injecting a liquid crystal material, which can sufficiently spread the high-viscosity liquid crystal material over the interior of a liquid crystal panel, and causes substantially no problem such as the creation of bubbles in the panel.

SUMMARY OF THE INVENTION

An object of the present invention to provide a method of injecting a liquid crystal material and an apparatus for injecting a liquid crystal material, which are capable of solving the above-mentioned problem encountered in the prior art.

Another object of the present invention is to provide a method of injecting a liquid crystal material and an apparatus for injecting a liquid crystal material, which are capable of injecting a liquid crystal material of a volume that favorably matches with the volume of a liquid crystal panel, while suppressing the evolution of bubbles in the panel.

As a result of earnest study, the present inventor has found that it is very effective in attaining the above object, to adopt a method wherein, in addition to the essential space A for display of the liquid crystal panel, reservoir means is provided for providing space B to be communicated with the space A for display and, further, the amount of the liquid crystal material to be injected is so selected as to establish a predetermined relationship relative to the spaces A and B.

The method of injecting a liquid crystal material according to the present invention is based on the above discovery. More specifically, this method comprises the steps of:

disposing a liquid crystal material on one substrate (S1) for constituting a pair of substrates; and disposing another substrate (S2) for constituting the pair of substrate above the substrate (S1), and attaching the pair of substrates S1 and S2 with each other;

wherein, at the time of the attachment of the pair of substrates S1 and S2 together, a closed space B is formed by reservoir means so that the space B is communicated with a space A for liquid crystal display defined by the pair of substrates S1 and S2; and the liquid crystal material is disposed on the substrate S1 so that the mass of the liquid crystal material provides a volume not larger than the total volume of the spaces (A+B) at the time of the injection of the liquid crystal material.

According to the method of injecting a liquid crystal material or the present invention having the above constitution, the liquid crystal material can be injected maintaining a volume that favorably matches with the volume of the space A for display based on the reservoir (or buffer) action of the reservoir means for the space A for display even when the volume of the material varies due to a change in the phase of the liquid crystal material.

As a result of further study based on the above discovery, the present inventor has also found that the above effect of the present invention can be exhibited more reliably and in a highly sophisticated manner, when a predetermined temperature control is combined with the above-mentioned constitution of the present invention.

The present invention also provides an apparatus for injecting a liquid crystal material, comprising:

a chamber for providing a reduced pressure state therein;

a pair of surface plates disposed in the chamber, respectively for being in contact with a pair of the substrates for liquid crystal display;

liquid crystal material-supplying means for disposing a liquid crystal material in a space between the pair of substrates for liquid crystal display; and temperature control means for controlling the temperature of the pair of surface plates;

wherein at least portion of the pair of surface plates being in contact with the substrates comprise a heat sink material.

The embodiment of the invention combined with the temperature control makes it possible to very uniformly control the temperature over the whole substrate surface. Among the smectic liquid crystals, for example, in the case of the polarization shielding-type smectic liquid crystal display which is expected to offer excellent display characteristics particularly when used for the TV display, the isotropic phase must be maintained and the temperature drop of about 1° C. per minute must be strictly controlled after the liquid crystals have been injected into the panel by the ODF method. The embodiment of the invention combined with the temperature control can be particularly preferably applied for very uniformly controlling the temperature over the whole surface of the substrate.

In dealing with a large glass substrate having a diagonal distance of, particularly, not smaller than 30 inches according to the prior art, it was difficult to uniformly maintain the temperature of the liquid crystals dropped on the substrate over the whole glass surface.

The present invention further provides a patterned seal member, which is patterned in accordance with a pattern to be disposed on a liquid crystal display substrate and which, when another substrate is attached to each other so as to constitute a pair of substrates, exhibits a function for maintaining a gap between the pair of substrates, wherein, when the pair of substrates are attached to each other, the seal member defines a space A for liquid crystal display between the pair of substrates and a space B to be communicated with the space A.

For example, the present invention may include the following embodiments.

(1) A method of injecting a liquid crystal material, comprising the steps of:

disposing a liquid crystal material on one substrate (S1) for constituting a pair of substrates; and disposing another substrate (S2) for constituting the pair of substrate above the substrate (S1), and attaching the pair of substrates S1 and S2 with each other;

wherein, at the time of the attachment of the pair of substrates S1 and S2 together, a closed space B is formed by reservoir means so that the space B is communicated with a space A for liquid crystal display defined by the pair of substrates S1 and S2; and the liquid crystal material is disposed on the substrate S1 so that the mass of the liquid crystal material provides a volume not larger than the total volume of the spaces (A+B) at the time of the injection of the liquid crystal material.

(2) A method of injecting a liquid crystal material according to (1), wherein the spaces A and B are isolated from each other after the pair of substrates S1 and S2 are attached to each other.

(3) A method of injecting a liquid crystal material according to (1), wherein the temperature at the time of the injection of the liquid crystal material is higher than room temperature (25° C.).

(4) A method of injecting a liquid crystal material according to (4), wherein the temperature at the time of the injection of the liquid crystal material is not lower than 100° C.

(5) A method of injecting a liquid crystal material according to (1), wherein the liquid crystal material is heated so as to be disposed between the pair of substrates S1 and S2, and, thereafter, the temperature of the liquid crystal material is lowered.

(6) A method of injecting a liquid crystal material according to (5), wherein the liquid crystal material is heated to show an isotropic phase so as to be disposed between the pairs of substrates S1 and S2.

(7) A method of injecting a liquid crystal material according to (1), wherein the spaces A and B are defined by a patterned seal member disposed on the pair of substrates S1 and/or S2.

(8) A method of injecting a liquid crystal material according to (7), wherein, in the seal pattern, a seal portion corresponding to the space A and a seal portion corresponding to the space B comprise seal members having different curing mechanisms.

(9) A method of injecting a liquid crystal material according to (8), wherein the seal portion corresponding to the space A comprises a UV-curable seal member, and the seal portion corresponding to the space B comprises a thermosetting seal member.

(10) A method of injecting a liquid crystal material according to (7), wherein, in the seal pattern, a seal portion corresponding to the space A and a seal portion corresponding to the space B comprise seal members having the same curing mechanism.

(11) A method of injecting a liquid crystal material according to (10), wherein a seal portion corresponding to the space A and a seal portion corresponding to the space B comprise a UV-curable seal member.

(12) A method of injecting a liquid crystal material according to (10), wherein a seal portion corresponding to the space A and a seal portion corresponding to the space B comprise a thermosetting seal member.

(13) A method of injecting a liquid crystal material according to (11), wherein after the pair of substrates S1 and S2 are attached to each other, a seal portion corresponding to the space A is selectively cured in the seal pattern by using a photo-mask and after the liquid crystal material has exhibited a phase suitable for display, a seal portion corresponding to the space B is cured.

(14) A method of injecting a liquid crystal material according to (11), wherein a seal portion corresponding to the space A is partially cured at first, and the pair of substrates S1 and S2 are attached to each other and, after the liquid crystal material has exhibited a phase suitable for display, a seal portion corresponding to the space B is cured.

(15) A method of injecting a liquid crystal material according to (11), wherein a liquid crystal material showing a smectic phase at room temperature is used as the liquid crystal material, a seal portion corresponding to the space A is partially cured at first, and the pair of substrates S1 and S2 are attached to each other and, after the liquid crystal material has exhibited a cholesteric phase or a smectic phase, a seal portion corresponding to the space B is cured.

(16) A method of injecting a liquid crystal material according to (12), wherein thermosetting seal members constituting the seal portion corresponding to the space A and the seal portion corresponding to the space B have different cure-starting temperatures.

(17) A method of injecting a liquid crystal material according to (12), wherein thermosetting seal members constituting the seal portion corresponding to the space A and the seal portion corresponding to the space B have different curing times.

(18) A patterned seal member, which is patterned in accordance with a pattern to be disposed on a liquid crystal display substrate and which, when another substrate is attached to each other so as to constitute a pair of substrates, exhibits a function for maintaining a gap between the pair of substrates, wherein, when the pair of substrates are attached to each other, the seal member defines a space A for liquid crystal display between the pair of substrates and a space B to be communicated with the space A.

(19) A patterned seal member according to (18), wherein the pattern includes a seal portion that provides the space A and at least one seal portion that provides an hole and/or a projecting portion corresponding to the space B.

(20) A patterned seal member according to (18), which is disposed on a substrate for liquid crystal display.

(21) A patterned seal member according to (18), wherein a seal portion corresponding to the space A and a seal portion corresponding to the space B comprise resins of different kinds.

(22) A patterned seal member according to (18), wherein a seal portion corresponding to the space A and a seal portion corresponding to the space B comprise seal members having different curing mechanisms.

(23) A patterned seal member according to (22), wherein a seal portion corresponding to the space A comprises a UV-curable seal member and a seal portion corresponding to the space B comprises a thermosetting seal member.

(24) A patterned seal member according to (18), wherein a seal portion corresponding to the space A and a seal portion corresponding to the space B comprise seal members having different curing temperatures.

(25) A patterned seal member according to (18), wherein a seal portion corresponding to the space A, a seal portion corresponding to the hole and a seal portion corresponding to the space B comprise seal members having curing rates different from one another.

(26) A patterned seal member according to (21), wherein a seal portion corresponding to the space A comprises a UV-curable seal member and a seal portion corresponding to the space B comprises a cure-retarding UV-curable seal member and/or a thermosetting seal member.

(27) An apparatus for injecting a liquid crystal material, comprising:
 a chamber for providing a reduced pressure state therein;
 a pair of surface plates disposed in the chamber, respectively for being in contact with a pair of the substrates for liquid crystal display;
 liquid crystal material-supplying means for disposing a liquid crystal material in a space between the pair of substrates for liquid crystal display; and
 temperature control means for controlling the temperature of the pair of surface plates;
 wherein at least portion of the pair of surface plates being in contact with the substrates comprise a heat sink material.

(28) An apparatus for injecting a liquid crystal material according to (27), wherein the heat sink material is a silicone rubber.

(29) An apparatus for injecting a liquid crystal material according to (27), wherein the heat sink material contains a liquid heat medium therein.

(30) An apparatus for injecting a liquid crystal material according to (27), wherein the heat sink material contains means for circulating a liquid heat medium therein.

(31) An apparatus for injecting a liquid crystal material according to (30), wherein the liquid heat medium is at least a kind of highly heat resistant liquid selected from the group consisting of: ethylene glycol and synthetic engine oil.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 9 is a schematic plan view illustrating a conventional general seal pattern for ODF;

FIG. 10 is a schematic perspective view of a system for calculating the effect of thermal expansion when the liquid crystal material is injected; and FIG. 11 is a schematic perspective view illustrating the size of the system of FIG. 10.

DETAILED DESCRIPTION OF THE PREFERRED EMBODIMENTS

Figure 1:
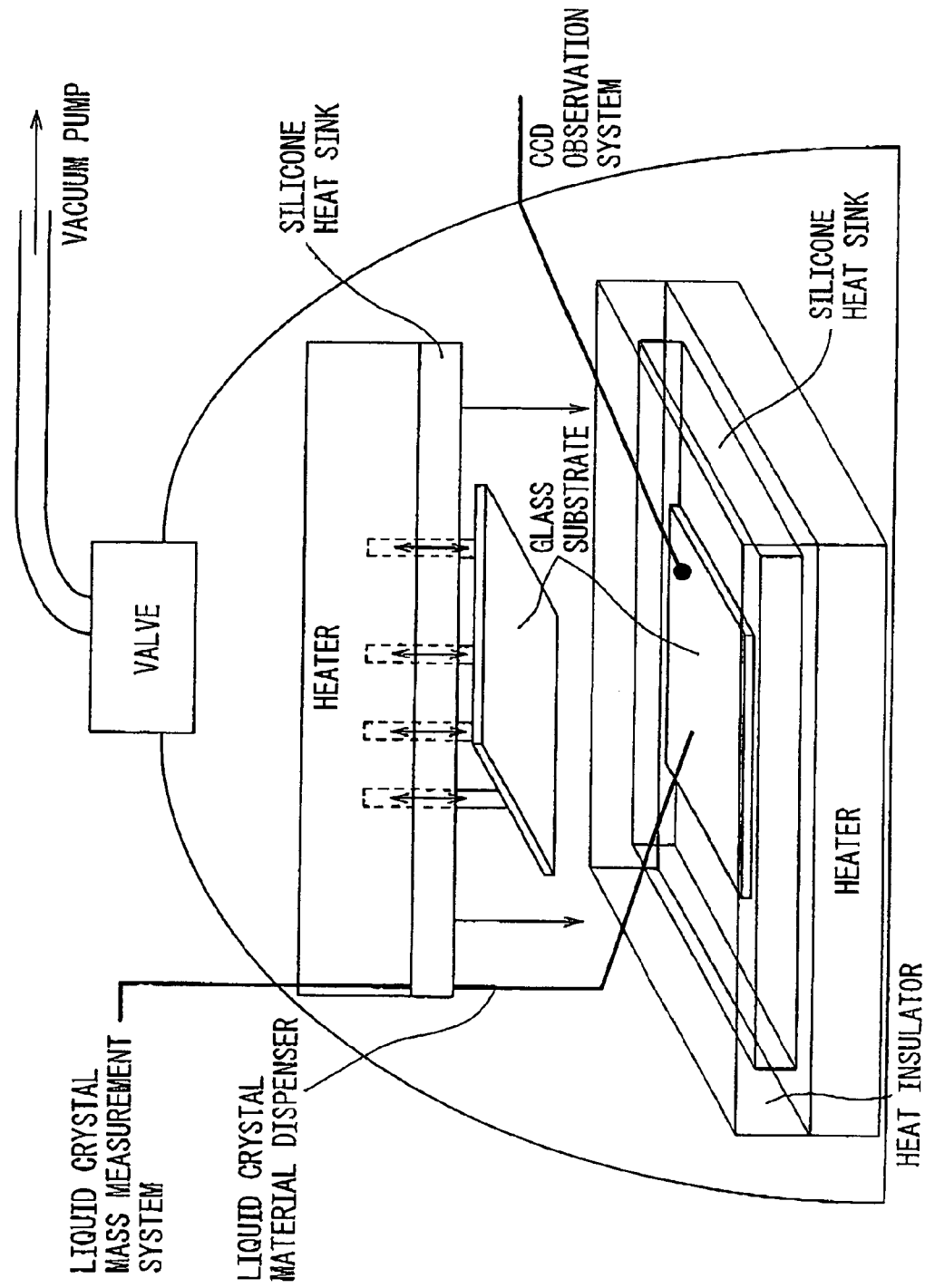
FIG. 1 is a schematic perspective view illustrating the constitution of the whole apparatus for uniformly maintaining the temperature of a large panel that can be desirably used for the method of producing a liquid crystal panel of the invention.

Hereinbelow, the present invention will be described in detail with reference to the accompanying drawings, as desired. In the following description, "%" and "part(s)" representing a quantitative proportion or ratio are those based on mass, unless otherwise noted specifically.

(Method of Injecting the Liquid Crystal Material)

The method of injecting the liquid crystal material of the invention comprises at least the steps of disposing a liquid crystal material on one substrate (S1) that constitutes a pair of substrates, and disposing another substrate (S2) that constitutes the pair of substrates on the substrate (S1) and attaching the pair of substrates S1 and S2 together.

At the time of the attachment of the pair of substrates S1 and S2 together according to the invention, reservoir means forms a space B that is communicated with a space A for liquid crystal display defined by the pair of substrates S1 and S2. In injecting the liquid crystal material, the liquid crystal material is disposed on the substrate S1 in a manner that the volume of the liquid crystal material is not larger than the sum of volumes of the spaces (A+B). In the present invention, further, after the pair of substrates S1 and S2 are attached to each other, the space A is physically isolated from the space B.

Here, the "space for liquid crystal display" refers to a space in the liquid crystal panel which is filled with the liquid crystal material for displaying image based on the liquid crystals.

(Mechanism of the Invention)

According to the knowledge by the present inventors, it is presumed that the "evolution of bubbles in the panel" that is likely to occur accompanying a change in the temperature is suppressed based on a mechanism described below.

That is, in the conventional ODF method, the volume of the liquid crystal material reliably decreases upon lowering the temperature of the liquid crystal material from the isotropic phase down to the smectic phase. On the other hand, the change of volume of the glass substrate due to the above change of the temperature is very smaller than the change of volume of the liquid crystal material. It is presumed that due to a difference in the change of volume between the glass substrate and the liquid crystal material, the panel space becomes excessive or insufficient causing the bubbles to evolve in the panel.

According to the above-mentioned method of the present invention, on the other hand, a change in the volume of the liquid crystals is absorbed by the reservoir means presumably preventing the evolution of bubbles in the panel.

Generally, the greatest feature of the ODF method resides in that the liquid crystal material is dropped in an amount strictly in agreement with the volume of the panel, and the liquid crystal material being injected simultaneously (or in parallel) with the attaching of two pieces of glass substrates. In injecting the smectic liquid crystal material that requires a high-temperature environment, the advantage of the ODF method should be positively utilized. Concerning this according to the present invention, the reservoir means is disposed, and the bubbles are prevented from evolving in the panel by utilizing the advantage of the ODF method.

(Substrate)

The substrate usable in the present invention is not particularly limited, as long as it can provide the above-mentioned specific molecular initial alignment state". In other words, in the present invention, a suitable substrate can appropriately be selected, in view of the usage or application of LCD, the material and size thereof, etc. Specific examples thereof usable in the present invention are as follows.

A glass substrate having thereon a patterned a transparent electrode (such as ITO)

An amorphous silicon TFT-array substrate

A low-temperature poly-silicon TFT array substrate

A high-temperature poly-silicon TFT array substrate

A single-crystal silicon array substrate (Preferred Substrate Examples)

Among these, it is preferred to use following substrate, in a case where the present invention is applied to a large-scale liquid crystal display panel.

An amorphous silicon TFT array substrate (Liquid Crystal Material)

The liquid crystal material usable in the present invention is not particularly limited as long as it can provide the above-mentioned specific "molecular initial alignment state". In other words, in the present invention, a suitable liquid crystal material can appropriately be selected, in view of the physical property, electric or display performance, etc. For example, various liquid crystal materials (including various smectic C phase, chiral smectic C phase liquid crystal materials) as exemplified in a publication of Ferroelectric liquid crystal displays and their materials; CMC publishing, Tokyo April, 1992, Edited by Atsuo Fukuda may generally be used in the present invention. Specific preferred examples of such liquid crystal materials usable in the present invention are as follows.

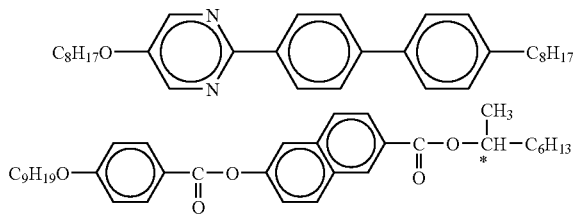

(Preferred Liquid Crystal Material Examples)

Among these, it is preferred to use the following liquid crystal material, in a case where the present invention is applied to a projection-type liquid crystal display.

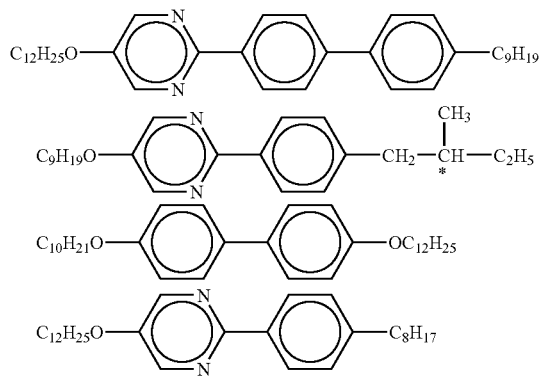

(Alignment Film)

The alignment film usable in the present invention is not particularly limited as long as it can provide the above-mentioned specific "molecular initial alignment state". In other words, in the present invention, a suitable alignment film can appropriately be selected, in view of the physical property, electric or display performance, etc. For example, various alignment films as exemplified in a publication of Ferroelectric liquid crystal displays and their materials; CMC publishing, Tokyo April, 1992, Edited by Atsuo Fukuda may generally be used in the present invention. Specific preferred examples of such alignment films usable in the present invention are as follows.

Polymer alignment film: polyimides, polyamides, polyamide-imides Inorganic alignment film: $SiO_2$, SiO, $Ta_2O_5$, etc.

(Preferred Alignment Film Examples)

Among these, it is preferred to use the following alignment film, in a case where the present invention is applied to a projection-type liquid crystal display.

Inorganic Alignment Films

In the present invention, as the above-mentioned substrates, liquid crystal materials, and alignment films, it is possible to use those materials, components or constituents corresponding to the respective items as described in "Liquid Crystal Device Handbook" (1989), published by The Nikkan Kogyo Shimbun, Ltd. (Tokyo, Japan), as desired.

(Other Constituents)

The other materials, constituents or components, such as transparent electrode, electrode pattern, micro-color filter, spacer, and polarizer, to be used for constituting the liquid crystal display according to the present invention, are not particularly limited, unless they are against the purpose of the present invention (i.e., as long as they can provide the above-mentioned specific "molecular initial alignment state"). In addition, the process for producing the liquid crystal display device which is usable in the present invention is not particularly limited, except the liquid crystal display device should be constituted so as to provide the above-mentioned specific "molecular initial alignment state". With respect to the details of various materials, constituents or components for constituting the liquid crystal display device, as desired, "Liquid Crystal Device Handbook" (1989), published by The Nikkan Kogyo Shimbun, Ltd. (Tokyo, Japan) may be referred to.

(Reservoir Means)

In the present invention, there is no particular limitation on the size, material, shape and number of the reservoir means or in the physical isolation means so far as there is obtained the space B that communicates with the space A for liquid crystal display defined by the pair of substrates when the pair of substrates are attached to each other and so far as the space A and the space B can be physically isolated from each other after the reservoir means has finished its role.

The reservoir means may be disposed in a number of one or in a plurality of numbers. The number of the reservoir means can be suitably determined depending upon the fluidity of the liquid crystal material and the size of the liquid crystal panel that is to be produced. From the standpoint of easily flowing the liquid crystal material substantially uniformly, however, it is desired that the reservoir means are disposed in an even number. More concretely speaking, it is desired to dispose the reservoir means in a number of 2 to 12 and, preferably, 2 to 6 (particularly, 2 to 4) along the circumference of the space A maintaining an equal distance.

(Preferred Reservoir Means)

In the present invention, it is desired to use the reservoir means that is described below from the standpoint of easily forming and disposing the reservoir means and easily communicating them with, and/or physically isolating them from, the space A.

(Size and Shape of Preferred Reservoir Means)

It is desired that the reservoir means provides a preferred volume of space B as described below. So far as this volume of space B is given, there is no particular limitation on the shape, dimension or size (e.g., depth, width, thickness, etc.) of the reservoir means.

According to the embodiment of the invention in which the liquid crystal material is injected maintaining a temperature higher than room temperature (25° C.) as will be described later, it may happen that the liquid crystal material flows from the space A for liquid crystal display into the space B which is the reservoir means (coefficient of thermal expansion of the seal member>coefficient of thermal expansion of the liquid crystal material) or, conversely, the liquid crystal material flows from the space B which is the reservoir means into the space A for liquid crystal display (coefficient of thermal expansion of the seal member<coefficient of thermal expansion of the liquid crystal material) as the temperature cools from when the liquid crystal material is injected (high temperature) down to room temperature due to a relationship between the coefficient of thermal expansion of the seal member having a function for defining space into where the liquid crystal material is to be injected and the coefficient of thermal expansion of the liquid crystal material.

The excess and lack of the liquid crystal material due to a change in the temperature can be suitably expressed by a change in the volume=$\Delta(V_{100}-V_{25})$. In the present invention, it is desired that the space B of the reservoir means is such that the change in the volume $\Delta(V_{100}-V_{25})$ corresponds to ±15% and, more preferably, corresponds to ±10% (particularly, ±8%).

As will be described later, the following results are obtained when the theoretical calculation is conducted by using a panel of a size ratio of 16:9 under particular conditions (coefficients of thermal expansion of the seal member and of the liquid crystal material, size of the seal, thickness).

① When the coefficient of thermal expansion of the seal member>>coefficient of thermal expansion of the liquid crystal material, the result is −8.55% with a 50-inch panel (i.e., 8.55% excess of the liquid crystal material).

② When the coefficient of thermal expansion of the liquid crystal material>>coefficient of thermal expansion of the seal member, the result is +7.5% (i.e., 7.5% lack of the liquid crystal material).

In the present invention, the reservoir space B is a closed system making it possible to substantially omit "a step" of isolating the space B from the space for liquid crystal display and, hence, to easily improve the throughput of the production as a whole.

(Preferred Material of the Reservoir Means)

Their is no particular limitation on the material of the reservoir means so far as the space B is given being communicated with the space A for liquid crystal display (i.e., so far as the liquid crystal material is allowed to flow between the space A and the space B to realize the effect of the invention) and the space A and the space B are physically isolated after the reservoir means has finished its role. From the standpoint of easiness when practically applied to the liquid crystal panels and the reliable isolation, it is desired that the above "physical isolation" is based on a chemical change (e.g., curing of resin). From this point of view, it is desired that at least one (desirably, both) of the "peripheral seal" and the reservoir means that provide the space A together with the pair of substrates, contains a curable resin.

(Curable Resin)

There is no particular limitation on the curable resin that can be used in the present invention so far as an early curing is accomplished by the "peripheral seal" portion and the curing is accomplished at a retarded timing by the reservoir means. As such a curable resin, there can be exemplified a UV (ultraviolet-ray) curable resin, a thermosetting resin, and a cure-retarding curable resin. In the present invention, it is allowable to use resins having different curing mechanisms in combination or to use resins having the same curing mechanism but different curing properties (e.g., curing time, curing temperature, curing wavelength) in combination.

In the preferred embodiment of the invention as will be described later, the mechanism for isolating the reservoir space B from the space A for liquid crystal display is a difference in the curing time (delay in the curing time)(or a timing for curing) of the seal member. In this embodiment, as the sealing member slowly cures near the gap between the liquid crystal display portion and the reservoir, the seal member spreads to fill the gap between the display portion and the reservoir (i.e., to isolate the liquid crystal display portion and the reservoir from each other).

In the present invention, further, it is desired that the difference between curing time of the seal member defining the display portion and the curing time of the seal member defining the reservoir portion is not longer than 10 minutes and, more preferably, about 1 minute to about 7 minutes (particularly, about 2 minutes to about 5 minutes). When the difference in the curing time is too short, the reproduceability for injecting the liquid crystals may decrease (the effect of disposing the reservoir decreases). When the difference in the curing time is too long, on the other hand, the throughput of production may decrease.

Concerning the details of the "curing time" (either UV curing or thermosetting) of the invention, reference can be made to the Handbook of Industrial Rubbers and Resins, 2003 published by Bosty Corporation (Japanese language).

(Amount of the Injected Liquid Crystal Material)

In the present invention, the liquid crystal material to be injected is disposed on one substrate of the pair of substrates in a manner that the volume of the liquid crystal material is not larger than the sum of volumes of the spaces (A+B). Then, after the pair of substrates are attached to each other, the space A and the space B are physically isolated from each other.

More concretely, if the specific gravity of the liquid crystals at a predetermined liquid crystal-forming temperature (e.g., room temperature=about 25° C.) is denoted by Dc, then, the mass Ma of the liquid crystal material that provides the volume Va of the space A alone is expressed by Ma=Va×Dc, and the mass $M_{a+b}$ of the liquid crystal material that provides the sum of volumes (Va+Vb) of spaces (A+B) is expressed by $M_{a+b}=(V_a+V_b)\times Dc$.

Preferred Embodiment

Described below is a preferred embodiment of the method of injecting a liquid crystal material of the invention.

Figure 4:
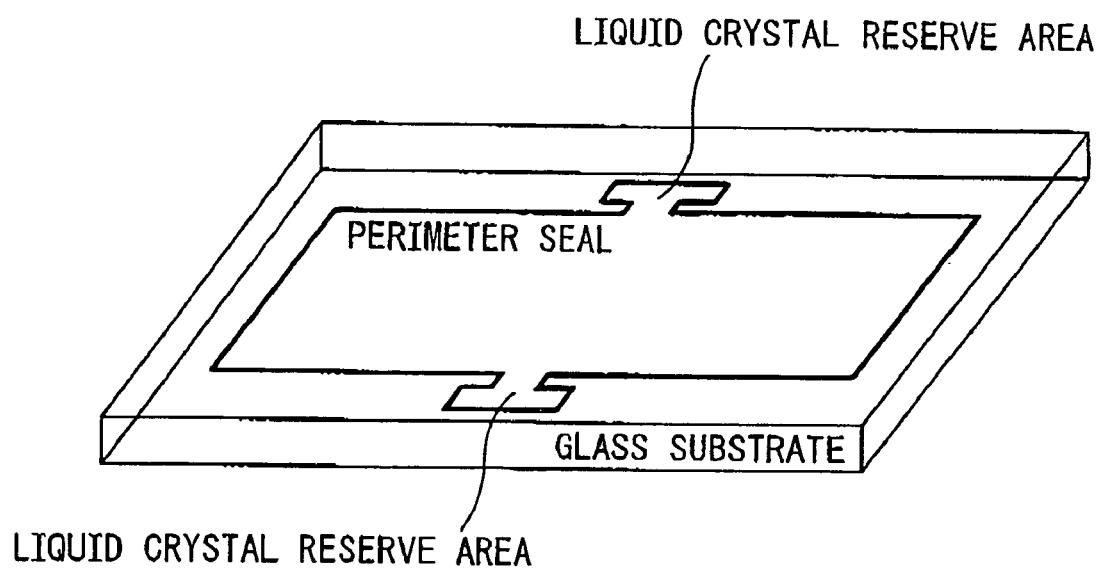
FIG. 4 is a schematic perspective view of a pattern of the peripheral seal provided with the "liquid crystal reservoir"

In this embodiment, reservoir means (a kind of "liquid crystal reservoir" regions) 41 are provided inside the panel as shown in FIG. 4 in order for the liquid crystals that are strictly weighed to maintain a volume which strictly is adapted to the volume in the panel at all times. The "liquid crystal reservoir" regions are not substantially overlapped on the display portion but are disposed outside the effective display region. Here, the "effective display region" stands for a region that is really put to the display of image.

The "liquid crystal reservoir" regions 41 play the role of compensating for the volume of the liquid crystals that decrease little by little in a step where the temperature gradually decreases from the isotropic phase temperature down to room temperature after the liquid crystals have been injected to bring the volume in the panel of the display portion into match with the volume of the liquid crystals at all times.

In general, the volume of the liquid crystals changes most remarkably when the liquid crystals are transformed from the isotropic phase into the cholesteric phase. When the phase shifts from the cholesteric phase into the smectic A phase, and from the smectic A phase into the chiral smectic C phase, the volume does not change so much as compared to the change of volume of the glass substrate, and the difference is not so great as to induce the evolution of bubbles. That is, the bubbles are most likely to evolve when the phase changes from the isotropic phase into the cholesteric phase. The liquid crystals, usually, maintain a very high fluidity when they are in the cholesteric phase. Therefore, the liquid crystals are smoothly fed from the "liquid crystal reservoir" into the effective display portion accompanying the change of phase from the isotropic phase into the cholesteric phase exhibiting the greatest change in the volume.

(Temperature)

In the present invention, though it is not an essential requirement to utilize the change of temperature, it is desired to utilize the change of temperature from the standpoint of smoothly injecting the liquid crystal material. In the embodiment of utilizing the change of temperature of the invention, too, the liquid crystal material of a suitable amount can be smoothly injected by utilizing the above-mentioned reservoir means.

In particular, it is desired to utilize the change of temperature at the time of injecting a liquid crystal material (e.g., chiral smectic liquid crystal material) that has heretofore been injected with difficulty.

The temperature for disposing (or injecting) the liquid crystal material is preferably not higher than 120° C. and, more preferably, not higher than 115° C. (particularly, not higher than 110° C.).

The time for cooling the temperature at the time of disposing the liquid crystal material down to room temperature (25° C.) is about 20 minutes to about 2.5 hours and, more desirably, about 30 minutes to about 2 hours (particularly, about 50 minutes to about one hour).

The cooling may be the natural cooling or the temperature-controlled cooling.

(Physical Isolation)

In the present invention, after the liquid crystal panel is formed by attaching, the space A for liquid crystal display and the space B given by the reservoir means are physically isolated from each other.

Thus, the evolution of bubbles of when the liquid crystal material is injected is effectively prevented by the "liquid crystal reservoir". In really using the liquid crystal panel, further, the bubbles that may evolve to some extent in the "liquid crystal reservoir" are substantially prevented from migrating into the space A for liquid crystal display.

That is, in injecting the liquid crystal material, the panel of which the temperature has dropped down to room temperature has been placed in a state where the liquid crystals have been injected into the panel and the smectic liquid crystal molecules have been oriented. However, the bubbles remain to some extent in the "liquid crystal reservoir" though they are not overlapped on the display portion. In most cases, the bubbles remaining in the "liquid crystal reservoir" are prevented from migrating due to a high viscosity of the chiral smectic liquid crystals and do not migrate into the display portion. Accompanying the temperature cycle of when the liquid crystal panel is really used, however, the liquid crystals surrounding the bubbles are exposed to such a probability that their orientation may be disturbed. In the use such as TV's that will be used for very long periods of time (long life time is required), therefore, the residence of bubbles in the reservoir portion may cast a problem though they are not in the display portion.

According to the present invention, however, the bubbles in the "liquid crystal reservoir" are isolated from the interior of the display portion and from the liquid crystals in the peripheral display portion, which is advantageous for maintaining reliability for extended periods of time.

(Physical Isolation Means).

In the present invention, there is no particular limitation on the physical isolation means that can be used so far as the liquid crystal material is allowed to substantially flow between the display portion and the reservoir means at the time when the liquid crystal material is injected or when the substrates are attached to each other, and so far as the liquid crystal material can be physically isolated between the display portion and the reservoir means after the substrates are attached to each other. From the standpoint of minimizing the amount of liquid crystals injected per a panel, it is desired to utilize a difference in the curing properties of the resin constituting the seal pattern that will be described later. As for the difference in the curing properties, there can be exemplified an embodiment that utilizes difference in the curing mechanisms, an embodiment that utilizes a difference in the curing conditions (temperature, etc.) and an embodiment that utilizes a difference in the curing times.

(Embodiment that Utilizes a Difference in the Curing Mechanisms)

Figure 5:
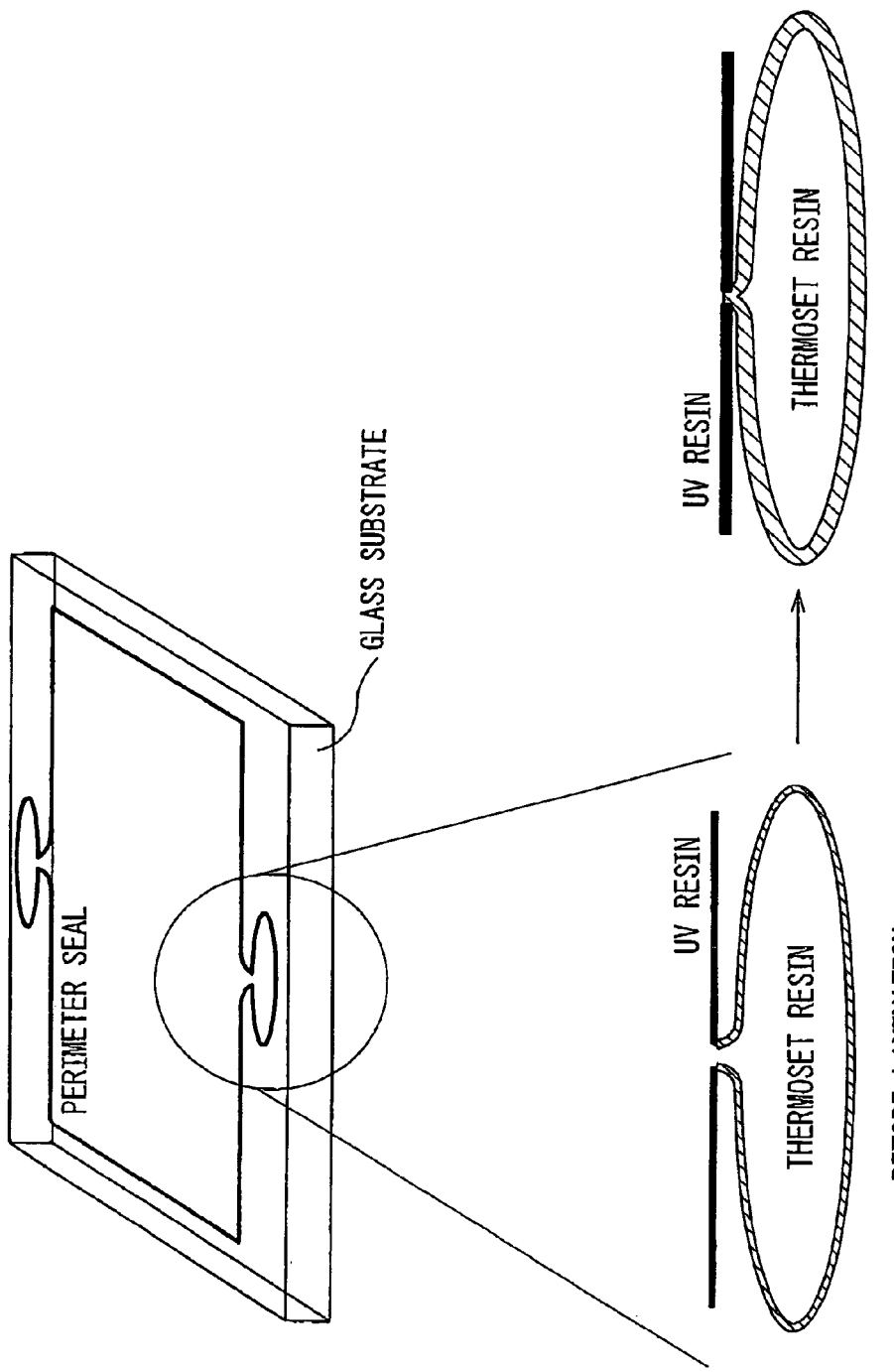
FIG. 5 is a schematic perspective view of a pattern provided with the "liquid crystal reservoir" and is capable of obtaining the effect of the invention.

In this embodiment, the curing mechanisms are differed between a resin constituting a seal pattern (e.g., pattern 52a in the constitution of FIG. 5) defining the liquid crystal material corresponding to the liquid crystal display portion and a resin constituting a seal pattern (e.g., liquid crystal reservoir pattern 51 in the constitution of FIG. 5) defining the reservoir means. A UV-curable resin can be used as the former resin and a thermosetting resin can be used as the latter resin.

(Embodiment that Utilizes a Difference in the Curing Conditions)

In this embodiment, the curing conditions (e.g., temperatures) are differed between a resin constituting a seal pattern (e.g., pattern 52a in the constitution of FIG. 5) defining the liquid crystal material corresponding to the liquid crystal display portion and a resin constituting a seal pattern (e.g., liquid crystal reservoir pattern 51 in the constitution of FIG. 5) defining the reservoir means. A thermosetting resin that cures at a relatively low temperature can be used as the former resin and a thermosetting resin that cures at a relatively high temperature can be used as the latter resin. In this embodiment, it is desired that the difference in the curing temperature between the former resin and the latter resin is not smaller than 30° C. and, more desirably, not smaller than 50° C. from the standpoint of reliably utilizing the difference in the curing conditions. Here, the curing temperature stands for the one that does not cause a distinguishable change in at least the retardation of liquid crystals at a desired cell gap even after the removal of force for compressing the panel from the outer side at the time of curing. However, the difference in the curing temperatures referred to here is probable to be affected even by the size of the panel, the number of liquid crystal reservoir, and a relationship between them.

(Embodiment that Utilizes a Difference in the Curing Times)

In this embodiment, the curing times are differed between a resin constituting a seal pattern (e.g., pattern 52a in the constitution of FIG. 5) defining the liquid crystal material corresponding to the liquid crystal display portion and a resin constituting a seal pattern (e.g., liquid crystal reservoir pattern 51 in the constitution of FIG. 5) defining the reservoir means. A curable resin that cures relatively quickly can be used as the former resin and a curable resin that cures requiring a relatively long period of time can be used as the latter resin. In this embodiment, it is desired that the difference in the curing time between the former resin and the latter resin is not shorter than 1 minute and, more preferably, not shorter than 2 minutes from the standpoint of reliably utilizing the difference in the curing conditions. However, the curing temperature referred to here is probable to be affected even by the size of the panel, the number of liquid crystal reservoir, and a relationship between them.

One Detailed Embodiment

Hereinbelow, an embodiment of the forming method according to the present invention will be described in more detail.

In general, in an ODF method using a smectic liquid crystal material wherein a high-temperature injection of the liquid crystal material is required, the above-mentioned liquid crystal reservoir (an embodiment of reservoir means) is required so as to suppress the production of bubbles. However, in the liquid crystal reservoir, bubbles can be produced during the temperature decreasing process, and the thus produced bubbles can provide a decrease in the long-term reliability with respect to the orientation of the liquid crystal molecules in the display region.

In the present invention, therefore, the "liquid crystal reservoir" is isolated from the display portion and the periphery of the display portion by using a certain measure form at the time of forming the panel.

In order to effectively incorporate this isolation into the ODF method, according to the present invention, a particular peripheral seal pattern 50 (peripheral seal pattern having at least one pattern 51 corresponding to the "liquid crystal reservoir") is provided as shown in FIG. 5 in, for example, the step of attaching the opposing glass substrate to the glass substrate on which the liquid crystals are dropped, and the width of the seal pattern when it is printed (or when the liquid crystal material is dispensed) and the width thereof after the substrate is stuck are defined to lie within suitable ranges, in order to physically isolate the liquid crystals the in portion 51 constituting the "liquid crystal reservoir", in the display portion and in the periphery 52 of the display portion.

That is, at the temperature of the isotropic phase, the chiral smectic liquid crystals of an amount slightly larger than a predetermined amount is weighed, dropped on the glass substrate, and are uniformly spread on the substrate (i.e., uniformly on the display portion, on the periphery 52 of the display portion and on the portion of the liquid crystal reservoir 51) utilizing a low viscosity of a high temperature and the pressure at the is time of attaching the other substrate.

At this moment as shown in FIG. 5A, the liquid crystals of an amount slightly greater than the volume between the substrates finally enter into the "liquid crystal reservoir" portion 51. At a moment when the two pieces of glass substrates are just attached to each other, the liquid crystals separated into the portion corresponding to the effective display portion 52 and the portion corresponding to the "liquid crystal reservoir" portion 51, are finally isolated from each other since the seals of these portion are pushed and expanded as shown in FIG. 5B by the pressure of attaching the glass substrates together. Here, the seals are pushed and expanded since the height of seals is lowered between the two pieces of glass substrates by the pressure of attaching and the width of the seals is expanded.

It is very desired that a narrow common portion 53 of the display portion and of the liquid crystal reservoir portion, is not isolated (is not separated) while the liquid crystals are being cooled from the isotropic phase liquid down to the cholesteric phase liquid crystals, and is not completely isolated until cooled down to the smectic A phase in which the volume of the liquid crystals change very little. Here, the words "is not completely isolated" mean that the common portion 53 permit the liquid crystal material to substantially move between the effective display portion 52 and the liquid crystal reservoir 51. Namely, a change in the size of the common portion 53 is permitted to some extent.

In general, the molecular orientation of the chiral smectic C phase liquid crystals requires a particularly strict volume control and a temperature control when their phase shifts from the smectic A phase to the chiral smectic C phase. Concerning the phase shift from the isotropic phase into the cholesteric phase, the volume control is accompanied by a relatively wide process margin in the present invention. Therefore, the above method is very effective and practicable.

When there is no sufficiently large temperature differential in the phase shift temperature among the phases of the liquid crystals (when, for example, the difference in the phase shift temperature is not larger than 3° C. (and, particularly, not larger than 2° C.)), there may be used, for example, the UV-curing resin for the peripheral seal portion 52a in FIG. 5 and the thermosetting resin for the "liquid crystal reservoir" portion 51 to lengthen the time before the seal of the "liquid crystal reservoir" portion is cured and to lengthen the time for permitting the liquid crystals to flow between the display portion 52 and the "liquid crystal reservoir" portion 51 to a sufficient degree.

Other Embodiments

Figure 6:
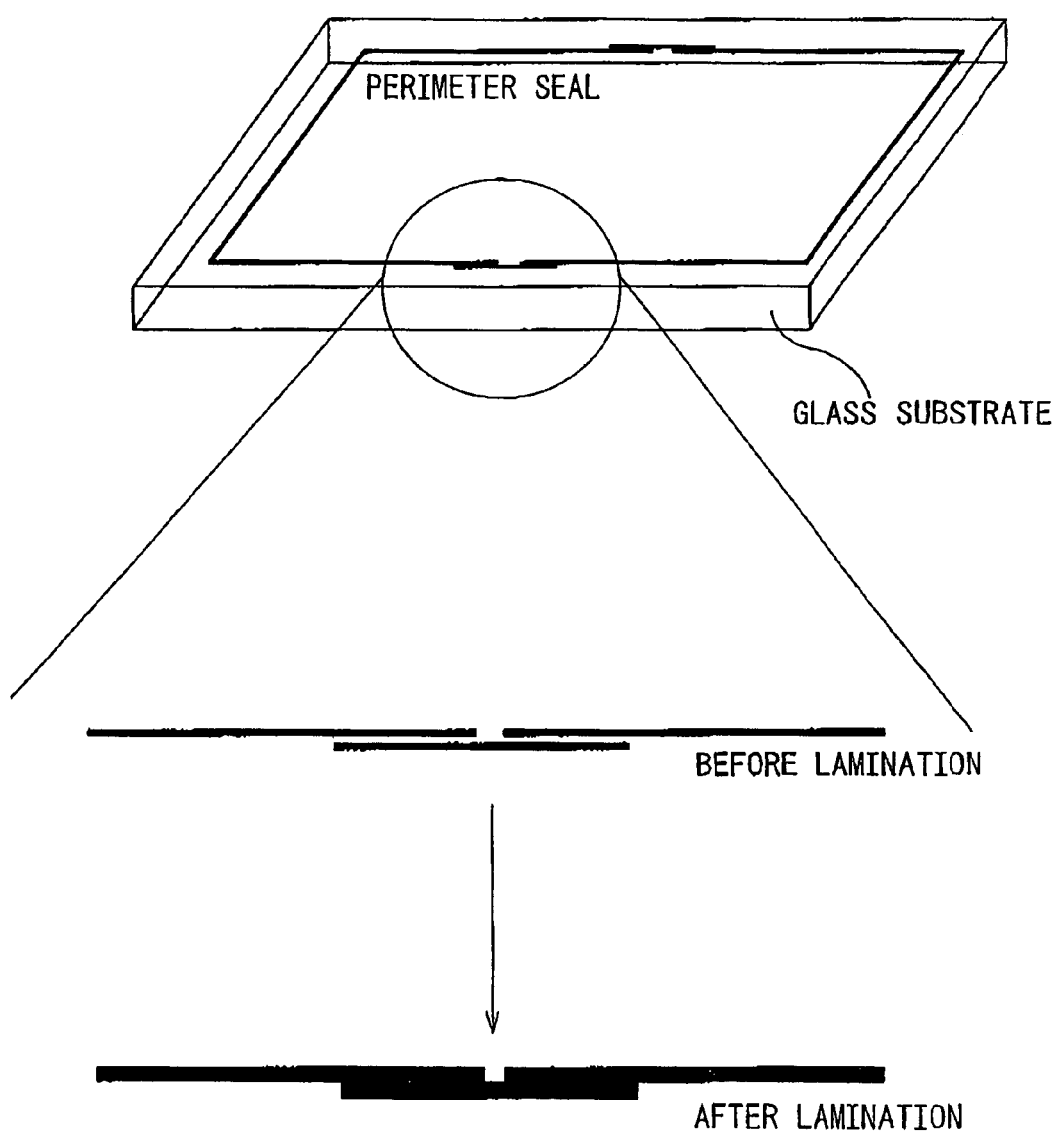
FIG. 6 is a schematic perspective view of a pattern of a modified seal of the "liquid crystal reservoir" in FIG. 5.

When the size of the substrate is not so large and the liquid crystals move in not so large amounts despite of a change in the volume of the liquid crystals when the isotropic phase shifts into the cholesteric phase (when the liquid crystals move in amounts of not larger than 0.005 mL (milliliters) due to an expected change in the volume of liquid crystals), there can be employed a simple method of forming a double-seal portion (i.e., "liquid crystal escape" portion 61) in a portion of the peripheral seal 62a as shown in FIG. 6. Then, as described in the embodiment of FIG. 5, the pressure is adjusted for attaching two pieces of substrates together and the migration of the liquid crystals is adjusted due to a change in the volume between the isotropic phase and the cholesteric phase and, finally, the hole of the peripheral seal is sealed.

(Liquid Crystal Reservoir/Liquid Crystal Escape)

The shape and size of the "liquid crystal reservoir" portion 51 or the "liquid crystal escape" portion 61 can be suitably selected depending upon the size of the liquid crystal panel that is fabricated or, more strictly, depending upon the capacity of the liquid crystals to be injected.

In a large panel having a diagonal distance of not smaller than 200 mm, in general, a difference increases between a change in the volume of liquid crystals in the panel and a change in the volume of the glass substrate due to the heating and cooling. Therefore, there can be preferably used a seal pattern including the "liquid crystal reservoir" portion 51 as shown in FIG. 5.

In a relatively small panel having a diagonal distance of about 100 mm, on the other hand, an absolute value of a change in the volume is relatively small, that accompanies a change in the temperature of the liquid crystals, glass and seal portion. It is, therefore, desired to use a simple seal pattern of the "liquid crystal escape" 61 shown in FIG. 6. To effectively and reliably partition the display portion 52 or 62, the "liquid crystal reservoir" portion 51 and the "liquid crystal escape" portion 61 in the step of gradually cooling from the isotropic phase temperature, it is desired to impart a difference in the curing time in the sealing portion of the peripheral sealing portion, the "liquid crystal reservoir" portion and the "liquid crystal escape" portion. That is, when the volume contracts greatly in a step where the liquid crystals that are dropped spread to every corner on the panel plane due to the pressure of the two pieces of glass substrates and where the phase thereof is shifting from the isotropic phase to the cholesteric phase, it is necessary that the liquid crystals are allowed to migrate between the display portion, the "liquid crystal reservoir" portion 51 or the "liquid crystal escape" portion 61 until the liquid crystals of a required amount enters into the display portion from the "liquid crystal reservoir" portion 51 or the "liquid crystal escape" portion 61, and that, at a temperature at which the volume has been contracted to a sufficient degree, the display portion 52 or 62 and the "liquid crystal reservoir" portion 51 or the "liquid crystal escape" portion 61 reliably isolated from each other. To realize the sealing of which the curing time differs depending upon the temperature, it is desired to use, for example, a UV-curable resin for the peripheral seal (display) portion and use a thermosetting resin for the "liquid crystal reservoir" portion 51 or the "liquid crystal escape" portion 61.

It is also allowable to use the UV-curable resin for the peripheral seal portion, "liquid crystal reservoir" portion 51 and "liquid crystal escape" portion 61, to false-cure the peripheral seal portion only when the liquid crystals are dropped and only when being heated without UV-curing the "liquid crystal reservoir" portion 51 or the "liquid crystal escape" portion 61 by using a photomask, and to effect the UV-curing at a temperature at which the volume contraction of the liquid crystals becomes sufficiently small. It is further desired to use a so-called cure-retarding curable resin for the "liquid crystal reservoir" portion 51 or the "liquid crystal escape" portion 61 only between the peripheral seal portion and the "liquid crystal reservoir" portion 51 or the "liquid crystal escape" portion 61 from the standpoint of putting the present invention into practice.

According to the present invention as described above, the "liquid crystal reservoir" portion 51 into which, and from which, the liquid crystals flow, are provided only when the two pieces of substrates are attached to each other. After the substrates have been attached to each other, the display portion 52 or 62 and the "liquid crystal reservoir" portion 51 are completely shut off; i.e., no bubble evolves in the display portion 52 or 62, and the "liquid crystal reservoir" portion 51 where the bubbles are remaining are completely shut off from the display portion. By using the above-mentioned silicone rubber stage having a large heat capacity in combination, further, it is made possible to strictly control the temperature change and to effectively inject the liquid crystals of the chiral smectic C phase having a very large viscosity at room temperature into a large panel.

(Temperature Control)

To more effectively carry out the method of injecting a liquid crystal material of the present invention mentioned above, it is desired to substantially uniformly maintain the substrate temperature of the liquid crystal panel (particularly, a large liquid crystal panel), i.e., to substantially uniformly maintain the temperature of the liquid crystals on the substrate over the whole surface of the substrate. Here, from the standpoint of "substantially uniformly maintaining the temperature over the whole surface of the substrate", it is desired that a difference between a maximum temperature and a minimum temperature of the substrate (a liquid crystal material is disposed on the inside thereof) for injecting the liquid crystal material, or a difference (maximum temperature difference on the inside of the substrate) from the minimum temperature, is not larger than 2° C. and, more desirably, not larger than 1° C. In the present invention, the substrate temperature can be measured by using, for example, a thermocouple in contact with the substrate.

To realize the above-mentioned preferred temperature control, it is desired to, at least, uniform the temperature in the chamber related to the ODF method. Usually, specific heats are greatly different among the liquid crystal material, glass substrate, metal constituting the chamber, air occupying the space in the chamber, and vacuum space. In particular, the specific heats are greatly different between a metal and the air. In practice, therefore, it is very difficult to uniform the temperature in the ODF chamber. When vacuum is required, in particular, a great difficulty is involved in controlling the temperature in the whole space.

(Apparatus for Injecting Liquid Crystal Material)

The apparatus for injecting liquid crystal material comprises:

a chamber for providing a reduced pressure state therein;

a pair of surface plates disposed in the chamber, respectively for being in contact with a pair of the substrates for liquid crystal display;

liquid crystal material-supplying means for disposing a liquid crystal material in a space between the pair of substrates for liquid crystal display; and temperature control means for controlling the temperature of the pair of surface plates;

wherein at least portion of the pair of surface plates being in contact with the substrates comprise a heat sink material.

(Preferred Apparatus for Injecting the Liquid Crystal Material)

Described below is an embodiment of an apparatus for injecting the liquid crystal material, that can be particularly preferably used for the method of injecting a liquid crystal material of the invention. Use of this apparatus for injecting the liquid crystal material makes it possible to greatly improve the uniformity of temperature of the glass substrate in injecting the liquid crystal material and, hence, to more easily form the liquid crystal panel having good characteristics.

FIG. 1 is a perspective view schematically illustrating a preferred embodiment of the apparatus for injecting the liquid crystal material of the invention. Referring to FIG. 1, the apparatus of this embodiment is provided with plates (heat sinks) 11a and 11b made of a silicone rubber having a sufficiently large heat capacity over and under the portion where glass substrates 10a and 10b are to be placed. The heat sinks 11a and 11b are disposed between the heaters 12a, 12b and the glass substrates 10a, 10b (i.e., the glass substrates 10a and 10b are heated by the heaters 12a and 12b via the heat sinks 11a and 11b).

As shown in FIG. 1, the heat sinks 11a and 11b made of the silicone rubber are intimately adhered to the glass substrates 10a and 10b so as to be uniformly and reliably brought into contact with the whole surfaces of the glass substrates and to maximize the contact areas between them to thereby uniform the temperature. Here, the volume of the silicone rubber is maintained to be sufficiently large, so that the heat capacity thereof is sufficiently great as compared to the heat capacity of the glass substrates thereby to easily maintain uniform the temperature of the glass substrates.

In the apparatus of FIG. 1, a valve 5 is disposed between a chamber 1 and a vacuum pump 4 for controlling the hole and closure between these elements. Further, a heat-insulating material 13a is disposed surrounding the heat sink 11a of silicone rubber to facilitate the temperature control (as required, it is allowable to similarly dispose the heat-insulating material to surround the other heat sink 11b as a matter of course).

A liquid crystal material dispenser 3 is disposed to feed the liquid crystal material between the glass substrates 10a and 10b, and a liquid crystal mass measurement system 6 is disposed being connected to the liquid crystal material dispenser 3 for measuring the amount of the liquid crystal material to be fed to the liquid crystal material dispenser 3. To observe the state of the liquid crystal material fed into between the glass substrates 10a and 10b, a CCD observation system 7 is disposed at a position where it can observe the liquid crystal material.

According to the method of injecting a liquid crystal material by the ODF method while controlling the temperature of the present invention as described above, it is allowed to uniform the temperature on the panel surface to a sufficient degree by using the heat sinks having a heat capacity larger than that of the panel, and to realize a precise temperature-lowering step. According to the embodiment of the invention, therefore, a large panel featuring a sufficiently highly uniform display can be fabricated maintaining a high throughput.

As for the liquid crystals in the step where the temperature is lowering from the isotropic phase temperature and as for preventing the evolution of bubbles due to a difference in the contraction of volume of the panel according to the preferred embodiment of the invention, use comprises seal members having different curing times to flow the liquid crystals only when necessary (in only a temperature range where the volume of the liquid crystals contract greatly), to complete the curing when the contraction of volume becomes sufficiently small, to completely shut off the display portion 52 or 62 from other portion to effectively satisfy all of reliability, productivity and uniformity of display.

On the other hand, when the liquid crystals are injected by utilizing the difference in the atmospheric pressure based on the isotropic phase temperature of the conventional method, a very extended period of time is required for injecting the liquid crystals, particularly, into a large panel, which is not realistic for the mass production. According to the ODF method used for injecting the liquid crystals in the prior art, further, the injection apparatus as a whole must be heated and a precise temperature control is necessary in the case of the smectic liquid crystals. Even if it is attempted to precisely control the temperature according to the prior art, a sufficient degree of uniformity is not guaranteed. In injecting the liquid crystals into the panel for a large direct view TV of a size of not smaller than 30 inches, in particular, only a small degree of non-uniformity on the panel surface causes non-uniformity of the orientation of the liquid crystal molecules.

Other Embodiments

Figure 2:
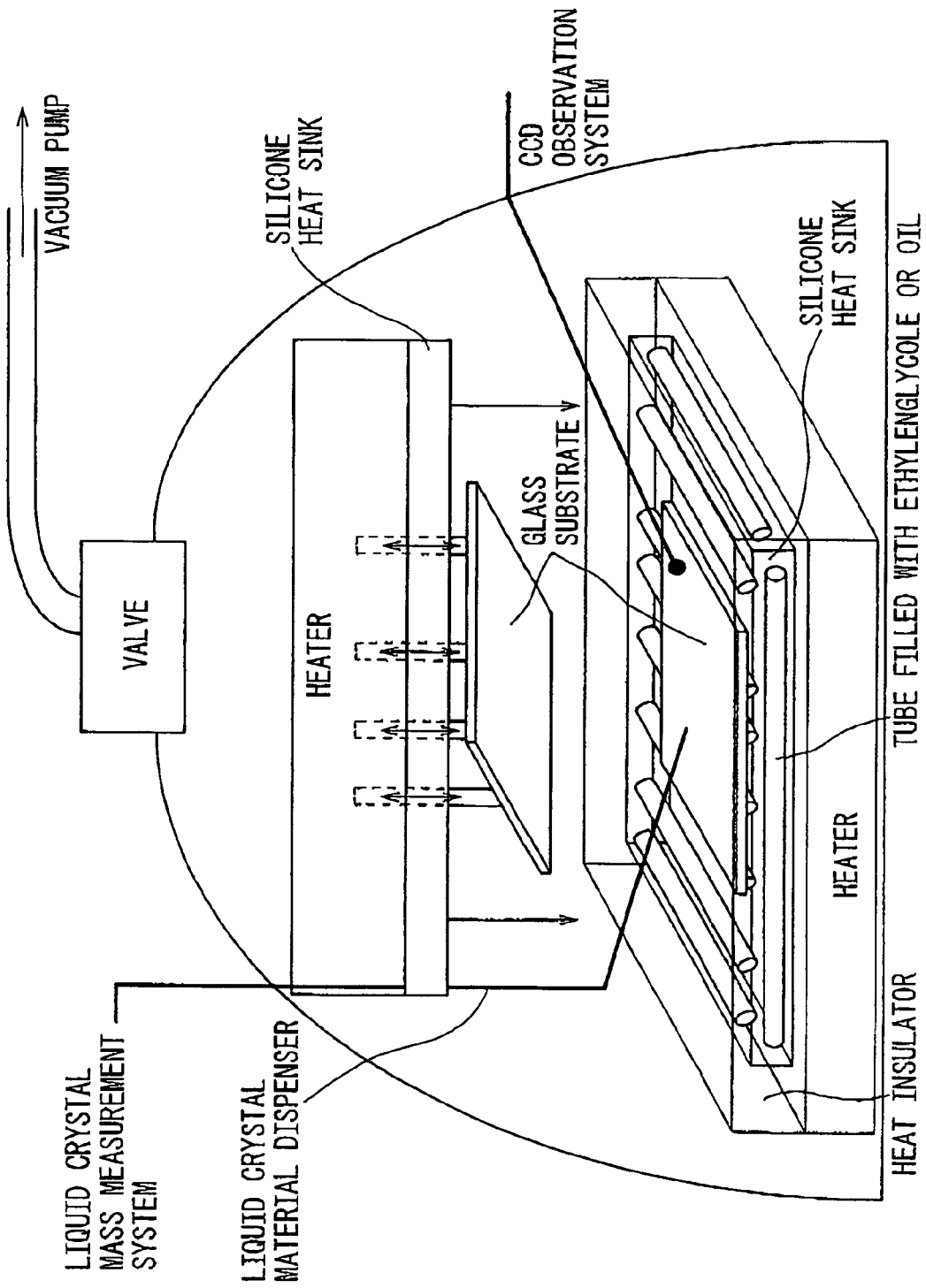
FIG. 2 is a schematic perspective view illustrating the constitution of a device for more strictly controlling the temperature of the liquid crystal glass substrate to be uniformed.

FIG. 2 is a perspective view schematically illustrating another preferred embodiment of the device for injecting liquid crystal material of the invention. Referring to FIG. 2, the apparatus of this embodiment has tubes 20 filled with an oil or an ethylene glycol having a high heat-insulating property, which are stuffed or disposed in the heat sink 11a made of a silicone rubber (as required, further, the other heat sink 11b may similarly contain the heat-insulating material disposed therein) in order to further increase the heat capacity of the heat sink 11a made of the silicone rubber, in addition to the above-mentioned constitution of FIG. 1.

Figure 3:
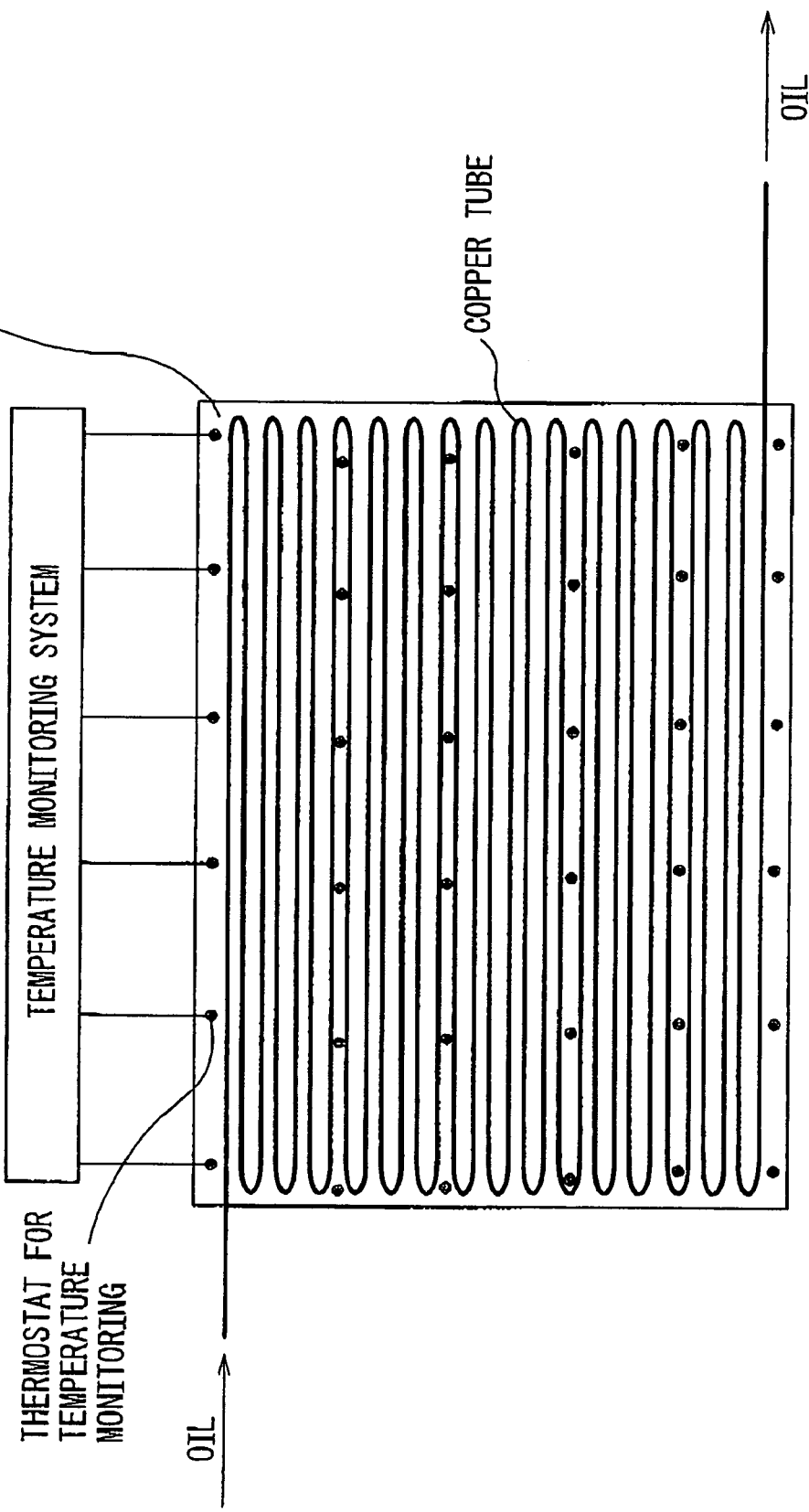
FIG. 3 is a schematic plan view of an apparatus for circulating a heat medium in FIG. 2.

Referring to a schematic plan view of FIG. 3 illustrating a further embodiment, tubes 20a (e.g., copper tubes) similar to those of FIG. 2 can be disposed in the heat sink 11a to circulate a liquid heat medium in the heat sink 11a made of the silicone rubber. In order to more reliably control the temperature of the liquid heat medium, further, temperature monitors 30 (e.g., thermistors) may be disposed in the heat sink made of the silicone rubber as shown in FIG. 3 to control the temperature by feedforward.

(Constitutions of Various Portion of the Apparatus)

As for the details of various portion constituting the apparatus for injecting the liquid crystal material of the invention, reference can be made, as required, to Japanese Unexamined Patent Publication (Kokai) No. 06-148657. The present invention, as required, uses the same elements as those used in the conventional apparatus for injecting the liquid crystal material (as for the constituent elements of the conventional apparatus for injecting the liquid crystal material, reference can be made, as required, to Japanese Unexamined Patent Publication (Kokai) No. 10-142616).

(Heat Sink)

There is no particular limitation on the material of the heat sink that can be used in the invention, tensile strength thereof and elongation at breakage thereof so far as they are not against the above-mentioned gist of the present invention. In the present invention, it is desired that the heat capacity of the heat sink is not smaller than 50 times as great as the heat capacity of the substrate (e.g., glass) and, more desirably, not smaller than 70 times as great (particularly, not smaller than 100 times as great).

In the present invention, for example, the following heat sink can be preferably used.

Material: silicone rubber

Size: 500 μm×400 mm×35 mm

Tensile strength: 10.3 MPa (JIS K 6249)

Elongation at breakage: 470%

(Liquid Heat Medium)

There is no particular limitation on the material of the liquid heat medium that can be used in the invention, heat resistance thereof, specific gravity thereof and viscosity thereof so far as they are not against the above-mentioned gist of the invention.

In the present invention, for example, the following liquid heat medium can be preferably used.

Material: Methyl-type silicone oil

Heat resistance: 250° C., 1,000 hours, no gelling

Specific gravity: 0.973 (25° C.)

Viscosity: 3,000 $mm^2$/s (25° C.)

Material:

(Heat Medium Tubes)

There is no particular limitation on the material of the heat medium tubes that can be used in the invention, size thereof and thickness thereof so far as they are not against the above-mentioned gist of the invention. In the present invention, for example, the following heat medium tubes can be preferably used.

Millable silicone rubber

Size: length of a side of 440 mm, outer diameter of 20 mm, inner diameter of 14 mm (Relationships Between the Peripheral Seal and the Required Amount of Liquid Crystals)

Specifying a relative relationship between the peripheral seal and the required amount of liquid crystals is very important for effectively executing the invention. There are the following cases between the two.

(1) When the coefficient of linear expansion of the peripheral seal members is greater than the coefficient of linear expansion of liquid crystals.

(2) When the coefficient of linear expansion of the peripheral seal members is smaller than the coefficient of linear expansion of liquid crystals.

(3) When the coefficient of linear expansion is almost the same between the peripheral seal members and the liquid crystals.

Described below are the requirements for effectively executing the invention concerning the cases (1) and (2). In the case (3), the seal member and the liquid crystals can be handled presuming that they are physically the same substance as can be easily derived from the content discussed in (1) and (2). When the coefficients of linear expansion are different between the peripheral seal member and the liquid crystals, a rational conclusion can be derived from the discussion of (1) and (2) as a matter of course.

(1) When the coefficient of linear expansion of the peripheral seal members is greater than the coefficient of linear expansion of liquid crystals.

The coefficients of linear expansion of the peripheral seal members that have now been placed in the market are typically about $1\times10^{-3}/°$ C. when they are large. On the other hand, the coefficients of linear expansion of liquid crystals are typically about $1\times10^{-5}/°$ C. when they are small. Therefore, the greatest difference occurs in the expansion and contraction of the peripheral seal member and of the liquid crystals when the peripheral seal member expands and contracts greater than the liquid crystals. According to the conventional liquid crystal injection method and the ODF liquid crystal injection method without accompanied by the element of the present invention, a very serious trouble may often occur in the orientation of liquid crystal molecules accompanying the rise and drop of the temperature, and a radical improvement is indispensable. After the liquid crystals are drop-injected at 100° C., a panel is formed and the temperature is cooled down to room temperature. At this moment, the peripheral seal members contract earlier than the contraction of the liquid crystals. That is, being affected by the peripheral seal members that contact earlier than the liquid crystals, the liquid crystals are placed under a kind of "pressurized" state receiving physical stress from the glass substrates. The pressure impairs the formation of the layer structure which the liquid crystals should naturally show, and the molecular orientation of liquid crystals is disturbed.

As the most extreme situation, considered below is a case (FIGS. 10 and 11) where the coefficient of linear expansion of the peripheral seal members at room temperature up to 100° C. is greater by hundreds of times than the coefficient of linear expansion of the liquid crystals over the same temperature range.

Here, when the temperature is elevated from room temperature up to 100° C. necessary for the temperature-controlled ODF liquid crystal injection, the volume in the panel expands from a volume $V_{25}$ at room temperature (25° C.) up to a volume $V_{100}$ at 100° C. as expressed below.

The seal member has a coefficient of linear expansion of $1\times10^{-3}/°$ C. When the seal member has a width of 2 mm as shown in FIG. 10, the expansion is 0.15 mm on both surfaces and is 0.075 mm on one surface.

Expansion on both surfaces=2 mm×$(1\times10^{-3})$×$(100-25)$= 0.15 mm $$V_{25}=\{ab-4(a+b-4)\}d$$

$$V_{100}=\{ab-0.15(a+b)+0.6\}\times1.075d$$

As a result, the volume of the liquid crystal panel, i.e., the required volume of liquid crystals that is neither excessive nor insufficient increases by $V_{100}-V_{25}$. Here, a and b are a long side and a short side (mm) of a screen having an aspect ratio of 16:9, and d (mm) is a panel gap. If the screen has a size of L (inches), then, a (mm)=22.14×L and b (mm)=12.54×L.

Here, however, the liquid crystals themselves increase their volumes when the temperature is elevated from room temperature to 100° C. Therefore, the amount of the liquid crystals properly needed for the temperature controlled ODF liquid crystal injection becomes the quantity obtained by subtracting the expansion or contraction of the liquid crystals themselves from the degree of expansion or contraction of the peripheral seal members. At this moment as shown in FIG. 11, it needs not be pointed out that the required amount of liquid crystals is affected by such factors as seal pattern, display area and panel gap. In general, a change in the volume of when the temperature has changed decreases with an increase in the size of the screen. The situation is concretely illustrated in Table below.

Change (%) in the volume=$(V_{100}-V_{25})/V_{25}=100\times\{0.075ab-0.15(a+b)-15.34\}/\{ab-4(a+b-4)\}$

| L (inch) | $V_{25}$ (mm³) | $V_{100}$ (mm³) | $\Delta(V_{100}V_{25})$ (%) |
|---|---|---|---|
| 50 | 1,364.41 | 1,481.02 | 8.55 |
| 40 | 871.02 | 947.77 | 8.81 |
| 30 | 487.95 | 533.10 | 9.25 |
| 20 | 215.01 | 236.83 | 10.15 |
| 15 | 119.94 | 133.36 | 11.19 |
| 10 | 52.39 | 59.15 | 12.90 |
| 5 | 12.44 | 14.77 | 18.73 |
| 2 | 1.68 | 2.35 | 39.88 |

(2) When the coefficient of linear expansion of the peripheral seal members is smaller than the coefficient of linear expansion of liquid crystals.

As another extreme example, considered below is a case where the liquid crystals expand or contract greater than the peripheral seal members. In this case, unlike the case discussed in (1) above, there arouses a serious problem in the quality of display, such as occurrence of bubbles in the display panel.

After the liquid crystals are injected by the temperature-controlled ODF liquid crystal injection method at 100° C., the panel is formed and the temperature drops down to room temperature. At this moment, the liquid crystals contract greater than, and earlier than, the contraction of the peripheral seal members. In this case, at a temperature anywhere between 100° C. and room temperature, the volume of the liquid crystals becomes smaller at all times than the volume in the panel which is a space defined by the peripheral seal portion and the glass substrates. In case the difference becomes greater than a predetermined value, therefore, there arouses a problem of evolution of a gas from the liquid crystals.

When the coefficient of linear expansion of the peripheral seal members is smaller than the coefficient of linear expansion of the liquid crystals, the volumes of the two at each temperature greatly vary depending not only upon a difference in the linear expansion between them at each temperature but also upon the size of the panel. This situation can be generalized as described below.

That is, if the volume in the panel at room temperature (25° C.) volume of the liquid crystals=$V_{rt}$, the coefficient of volume expansion of the seal member is Es/° C. and the coefficient of volume expansion of the liquid crystals is $E_{1c}$, then, the volume in the panel at 100° C. increases by about $V_{rt}\times E_s\times75=75E_sV_{rt}$ into $(1+75E_s)V_{rt}$.

On the other hand, the volume contraction of the liquid crystals of when the temperature has dropped down to 25° C. becomes $(1+75E_s)V_{rt}\times E_{1c}\times75=75(1+75E_s)E_{1c}V_{rt}$.

In the case of the above coefficient of volume expansion, therefore, the volume of the liquid crystals injected at 100° C. to be just equal to the volume of the panel becomes $[1-75(1+75E_s)E_{1c}]V_{rt}$ when the temperature is lowered down to 25° C. In this case, space develops in the panel by $75(1+75E_s)E_{1c}V_{rt}$.

In order to prevent the occurrence of too small space in the panel at room temperature, therefore, it is necessary to maintain a state which is neither excessive nor insufficient relative to the space by permitting the liquid crystals of an amount $75(1+75E_s)E_{1c}V_{rt}$ to flow into the panel.

As described above, if the coefficient of linear expansion of the seal members is $E_s/°$ C., the coefficient of linear expansion of the liquid crystal material is $E_{1c}/°$ C., the volume in the panel at 25° C., i.e., the volume of liquid crystals at 25° C. is $V_{rt}$, the temperature of injecting the liquid crystals is 100° C. and the room temperature is 25° C., then, the amount of liquid crystals that must be flown into the panel is $75(1+75E_s)E_{1c}V_{rt}$.

By using concrete numerical values, this can be calculated as described below.

That is, if the volume in the panel at room temperature (25° C.): volume of the liquid crystals=$V_{rt}$, the coefficient of volume expansion of the seal member is $1\times10^{-5}/°$ C. and the coefficient of volume expansion of the liquid crystals is $1\times10^{-3}/°$ C., then, the volume in the panel at 100° C. increases by about $V_{rt}\times10^{-5}\times75=0.00075V_{rt}$ into $1.00075V_{rt}$.

On the other hand, the volume contraction of the liquid crystals of when the temperature has dropped down to 25° C. becomes $1.00075V_{rt}\times10^{-3}\times75=0.075V_{rt}$.

In the case of the above coefficient of volume expansion, therefore, the volume of the liquid crystals injected at 100° C. to be just equal to the volume of the panel becomes $0.925V_{rt}$ when the temperature is lowered down to 25° C. In this case, space develops in the panel by $0.075V_{rt}$.

$$(1-0.075)V_{rt}=0.925V_{rt}$$

In order to prevent the occurrence of too small space in the panel at room temperature, therefore, it is necessary to maintain a state which is neither excessive nor insufficient relative to the space by permitting the liquid crystals of an amount $0.075V_{rt}$ to flow into the panel.

Namely, in this case, it will be learned that the liquid crystals of an amount of 7.5% of the volume of the panel at room temperature must flow in from the exterior of the panel or from the exterior of the display portion. The required amount of liquid crystals that must be flown varies depending upon the shape of the seal pattern as a matter of course.

In the present invention, in general, it is desired that the liquid crystals are permitted to flow in an amount of not larger than 15%, more preferably, not larger than 10% and, particularly, not larger than 8% of the volume of the panel (volume of the liquid crystals) at room temperature.

The temperature-controlled ODF liquid crystal injection method of the invention combined with the above-mentioned "liquid crystal reservoir" or the "liquid crystal escape", prevents the trouble caused by the dependency of the panel volume and the liquid crystal volume upon a change in the temperature, and realizes the temperature-controlled ODF liquid crystal injection method which is radically different from the ODF method which simply controls the temperature maintaining precision.

(Relationship Between the Peripheral Seal and the Seal of the Liquid Crystal Reservoir Portion)

In the preferred embodiment of the invention, the peripheral seal and the seal of the liquid crystal reservoir portion play an important role. To effectively flow in the liquid crystals from the outer side of the effective panel display portion relying on the ODF method of precise temperature control, it is desired to impart a time difference for curing the peripheral seal and the seal of the liquid crystal reservoir portion. This is because, the liquid crystals can be efficiently flown when the liquid crystals have a sufficiently low viscosity, i.e., when the temperature is sufficiently high.

In general, the volume of the liquid crystals vary most greatly when the isotropic phase shifts to the cholesteric phase. In practice, therefore, it is particularly desired to impart a difference in the curing time between the peripheral seal portion and the liquid crystal reservoir seal portion in a temperature range where the liquid crystals are shifted from the isotropic phase into the cholesteric phase. How much time difference be imparted for the curing may vary depending upon the size of the panel, phase shift temperature of the liquid crystals, curing time of the peripheral seal member, curing time of the liquid crystal reservoir seal member and the size of the liquid crystal reservoir. Generally, it is desired to maintain a time sufficient for the liquid crystals to flow sufficiently near the phase shift between the isotropic phase and the cholesteric phase where the volume of the liquid crystals varies most greatly. One of the effects of the temperature-controlled ODF liquid crystal injection method offered by the present invention is a high throughput of liquid crystal panel production. From the practical point of view, therefore, it is desired to set a difference in the curing time from the standpoint of accomplishing both necessary and sufficient fluidity of the liquid crystals and a high productivity in the mass production.

As means for imparting a difference in the curing time between the peripheral seal member and the liquid crystal reservoir seal member, there can be exemplified the following three practical methods, i.e., (1) use a thermosetting resin and a UV-curable resin, (2) use an instantly curable resin and a cure-retarding curable resin, which are the UV-curable resins, or (3) use the UV-curable resin while imparting a difference in the time for UV irradiation.

In the temperature-controlled ODF method, it is desired that at least the peripheral seal portion are cured as early as possible. If the peripheral seal member remains uncured while coming in a majority of portion into contact with the liquid crystals that are dropped, the uncured seal portion may elute out into the liquid crystals, and the seal member may be impaired from being cured as it mixes with the liquid crystals. Therefore, in all cases of the above methods (1) to (3), it is desired to use an instantly UV-curable resin as the peripheral seal member.

(Embodiment of Using the Thermosetting Resin and UV-Curable Resin)

In the above embodiment (1) of using the thermosetting resin and the UV-curable resin, it is desired to use an instantly UV-curable resin as the peripheral seal member and the thermosetting resin for sealing the liquid crystal reservoir portion. The peripheral seal using the instantly UV-curable resin is cured to a sufficiently degree by the UV-irradiation within about 3 minutes. On the other hand, the thermosetting resin is preferably the one that tacks in about 2 to 5 minutes at about 100° C. which is a typical temperature for dropping the liquid crystals (concerning the method of measuring the "tacking" time, reference can be made, as required, to the Handbook of Industrial Rubbers and Resins, 2003 published by Bosty Corporation (Japanese language)).

As the thermosetting rein, it is desired to use a so-called one-can epoxy resin. Curing agent capsules dispersed in the epoxy resin are crushed by the pressure at the time of attaching the glass substrates together, and the curing takes place.

When the above one-can epoxy resin is used, the liquid crystals are fluidized to a sufficient degree in 2 to 5 minutes and, then, the sealing width increases due to the pressure of the glass substrate; i.e., sealing width increases, too, between the liquid crystal reservoir portion and the peripheral seal portion (i.e., the gap decreases between the seals). The sealing width that has increased isolates the liquid crystal reservoir portion and the peripheral seal portion from each other.

(Embodiment of Using an Instantly Curable Resin and a Cure-Retarding Curable Resin, which are the UV-Curable Resins)

In the above embodiment (2) of using an instantly curable resin and a cure-retarding curable resin, which are the UV-curable resins, a difference is imparted to the seal material curing time between the seal portion and the liquid crystal reservoir seal portion over a period of 2 to 5 minutes like in the embodiment (1) to achieve the fluidity of liquid crystals and the isolation after the fluidization.

(Embodiment of Using the UV-Curable Resin while Imparting a Difference in the Time for UV Irradiation)

In the embodiment (3) of using the UV-curable resin while imparting a difference in the time for UV irradiation, first, the seal portion is selectively irradiated with ultraviolet rays to cure the seal portion to a sufficient degree, and the liquid crystal reservoir seal portion are slightly irradiated with ultraviolet rays to effect the so-called false-curing. After the liquid crystals are sufficiently fluidized, the seal members of the liquid crystal reservoir portion are irradiated with ultraviolet rays again to completely cure them.

According to this embodiment (3), the times for curing the peripheral seal and the liquid crystal reservoir seal can be set depending upon a difference in the time for starting the UV-irradiation. Therefore, the difference in the time can be freely set. From the standpoint of throughput of production, it is desired that the difference in the time is from 2 minutes to 5 minutes. Concerning the throughput of production, it is allowable to determine an optimum difference in the curing time depending upon the size of the panel to be produced and the mass production. The above methods (1) to (3) are conducted under preferred conditions for obtaining a sufficiently high throughput in the practical temperature-controlled ODF method.

(Heat Capacity of the Temperature-Holding Silicone Rubber)

The silicone rubber, usually, has a high heat resistance as an elastic material, and is suited as a member for controlling the glass substrate temperature of the temperature-controlled ODF device. In the temperature-controlled ODF method which is an embodiment of the invention, it is desired to heat the glass substrate at about 100° C. and to precisely control the temperature while the liquid crystals shift from the isotropic phase to the cholesteric phase producing the greatest change in the volume.

From the standpoint of production efficiently, it is desired that the temperature of the glass substrate is quickly elevated to 100° C. at a moment when the glass substrates at room temperature are brought into contact with the silicone rubber maintained at 100° C. Here, unless the heat capacity of the silicone rubber and of the device in contact therewith is very greater than the heat capacity of the glass substrates, the temperature on the surface of the silicone rubber temporarily drops when the glass substrates are brought into contact therewith. If the surface temperature of the silicone rubber drops even temporarily, the device must generate the heat to recover the drop. In this case, the temperature becomes non-uniform on the surface of the silicone rubber and the heat generated for recovering preset temperature is highly likely to cause a local over-shooting. A change in the volume of the liquid crystals is the greatest between the isotropic phase and the cholesteric phase. Therefore, a change and, particularly, irregular change of temperature on the surface of the silicone rubber may not often be allowable even for only a short period of time. In general, from the standpoint of throughput of production inhibiting almost any change in the temperature on the surface of the silicone rubber when the glass substrates are brought into contact with the silicone rubber, it is desired that the heat capacity of the silicone rubber portion is about 50 times as large and, more desirably, at least 100 times as large as the heat capacity of the glass substrates.

(Removal of Liquid Crystals from Near the Injection Port after the Injection)

In the liquid crystal injection method (conventional liquid crystal injection method) by utilizing the so-called atmospheric pressure differential between the interior and the exterior of the liquid crystal panel, it is necessary to remove excess of liquid crystals after the liquid crystals have been injected. If the liquid crystals are adhered near the injection port, the adhering strength of the sealing agent becomes insufficient to impair the reliability of the liquid crystal panel. When the liquid crystals are injected into a large liquid crystal panel by utilizing the conventional atmospheric pressure differential method, the liquid crystals near the injection port are, usually, washed by blowing compressed pure water. Concretely speaking, the liquid crystals are blown off by a jet of pure water and, then, pure water adhered on the injection port is heated and dried, and a sealing agent is usually applied thereon. In a relatively small liquid crystal panel, further, the liquid crystals may be wiped and washed by using a member such as an applicator.

According to the method (ODF method) of the present invention, on the other hand, the injection of liquid crystals and the attaching of the panel can be incorporated in one step making it possible to omit the step of washing the liquid crystals. According to the temperature-controlled ODF method which is an embodiment of the present invention, the liquid crystals flow like when the liquid crystals are injected in the customary manner by utilizing the pressure differential. In the present invention, however, the liquid crystal reservoir portion finally confine extra liquid crystals therein preventing the problem of reliability.

Hereinbelow, the present invention will be described in more detail with reference to specific Examples.

EXAMPLES

Example 1

Figure 7A:
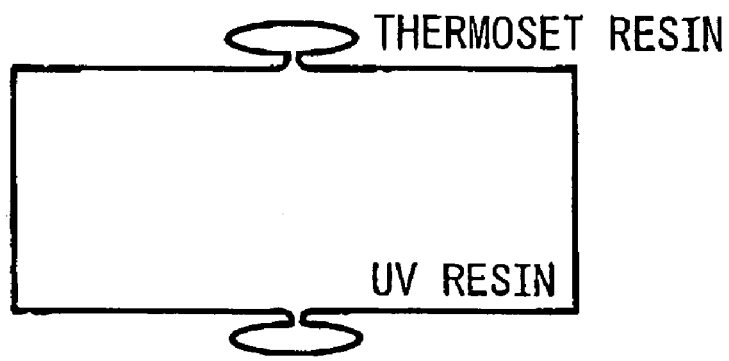
FIGS. 7A to 7C are schematic plan views illustrating a seal pattern provided with the "liquid crystal reservoir" and is capable of obtaining the effect of the invention, and a function thereof.

By using two pieces of non-alkali glass plates (trade name: 1737, manufactured by Coning Co.) measuring 300 mm×200 mm×0.7 mm t (thick) as substrates, a peripheral seal pattern shown in FIG. 7A was prepared by using a dispenser (trade name: Shotmaster 3S, manufactured by Musashi Engineering Co.). The seal member that was used was a UV-curable resin (trade name; 3025G, manufactured by Three-Bond Co.).

Further, the seal portion of the "liquid crystal reservoir" portion 72 of FIG. 7A were prepared by using a thermosetting resin (trade name: 3026E, manufactured by Three-Bond Co.).

The seal member prepared on one glass substrate of the two pieces of substrates possessed a width (at both the seal portion 71 and the liquid crystal reservoir portion 72) of 0.2 mm and an average height of 0.04 mm. Further, the liquid crystal reservoir portion 72 were measured to be about 10 mm vertically and about 80 mm laterally.

Silica balls having an average particle size of 1.8 μm (trade name: Shinshikyu, manufactured by Shokubai Kasei Kogyo Co.) were dispersed in an IPA (isopropyl alcohol)(concentration of about 0.06% by mass), and the mixture thereof was sprayed onto the other glass substrate of the two pieces of substrates by using a spin coater (trade name: Tokuchuhin, manufactured by Mikasa Co.). In this case, the mixture was so sprayed that the silica balls were nearly uniformly disposed at a density of about 100 balls/mm$^2$ on the region of 272.0 mm×172.0 mm on the glass substrate (concerning the details of the method of spraying the silica balls on the glass substrate, reference can be made, for example, to the literature "Latest Technology of High-Molecular Fine Particles and Expansion of Use", S. Omi, T, Sato, S. Kawase, CMC Publishing Co., Tokyo, 1997).

First, the two pieces of substrates prepared above were attached to each other (preliminary experiment) in order to make sure the final width of the seal width when the panel was fabricated by using the seal pattern. As a result, the seal width was 4.02 mm on the average. The cell gap was 2.0 μm on the average. From the above results, the volume of when the panel was attached to each other became 272.0×172.0×0.002 mm$^{2=93.568}$ mm$^3$.

The polarization-shielding ferroelectric liquid crystal material (developed by Nanoroa Co.) used in the present invention possessed a specific gravity at room temperature of 1.08. The liquid crystal material assumes the form of a wax at room temperature and could be weighed by weight instead of weighed by volume that is done by the customary ODF method. The weighing by weight is more precise than the weighing by volume by hundreds to thousands of times. By taking the liquid crystal reservoir portion into consideration, the weight of the liquid crystals dropping onto the panel was regarded to be 102.053 mg (which can be converted into a volume of 102.053 mg÷1.08=94.49 mm$^3$) at room temperature. The weight of the liquid crystal material at this moment was measured by using a precise balance (trade name: AX26DR, manufactured by Metler Co.).

Namely, in this embodiment, instead of measuring the volume of the liquid crystal material itself, the volume calculated from the weight is used as an index that represents the amount of injection of the liquid crystal material. Therefore, the amount of injection of the liquid crystal material becomes about 101% of the volume of the space A and about 100.5% of the volume of (space A+space B) based on the following numerical values.

Space A (volume of liquid crystal display portion 52 or 62)=93.568 mm$^3$.

Space B (volume of the liquid crystal reservoir portion) =1.404 mm$^3$.

Next, the liquid crystal material was disposed on the glass substrate used for really fabricating the liquid crystal panel. That is, the liquid crystal material of the above weight (102.053 mg) was divided into four, and was dropped onto the substrate forming the seal pattern maintaining nearly an equal distance (in a manner that four dropped masses were formed maintaining distances of 90 mm in the transverse direction and 60 mm in the longitudinal direction among the masses).

Thereafter, a substrate was placed on a heat sink made of a silicone rubber of which the constitution is shown in FIG. 1, its temperature was set to be 106° C. and, after one hour has passed, the other substrate (substrate on which the silica balls were disposed) was stuck thereto.

Next, the UV-curable resin constituting the peripheral seal pattern was cured under the following conditions.

Representative irradiation energy: 3,000 mJ
(Generally, 2,500 to 4,000 mJ)

The principal constitution of the apparatus of FIG. 1 used here was as described below.

<Constitution of the Apparatus of FIG. 1>

Vacuum chamber, board, heater, silicone rubbers (heat sinks), liquid crystal dispensing system (dispenser, weighing device), glass substrate lifting device, CCD observation system. In the apparatus of FIG. 1, a sufficiently stable temperature was reached in about 25 minutes from room temperature through up to a setpoint temperature of 106° C. After the two pieces of substrates were attached to each other, the apparatus of FIG. 1 was set to be gradually cooled at a rate of 1° C. a minute.

Figure 7B:
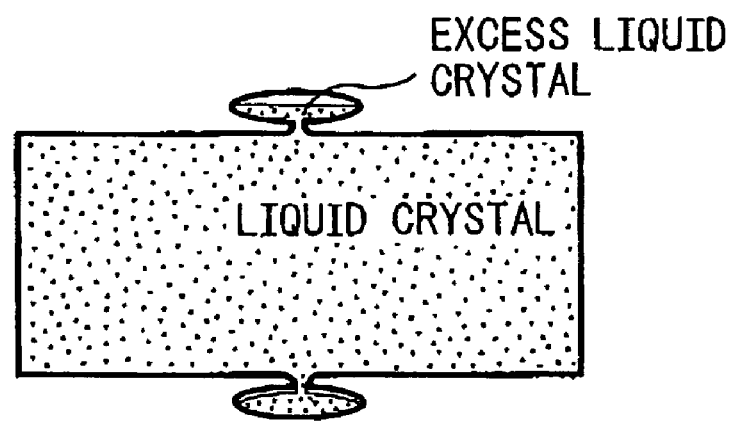
Figure 7C:
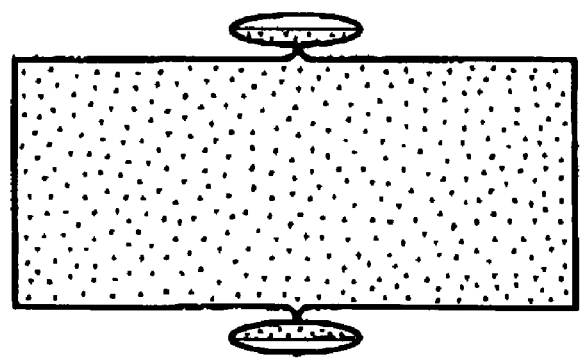

As a result of carefully observing the liquid crystal reservoir portion of the seal pattern of FIG. 7 by using a CCD camera (trade name: USB Microscope, manufactured by Scalar Co.) that is set in the apparatus as shown in FIG. 1, a remarkable flow of liquid crystals was observed between the display portion 52 or 62 and the liquid crystal reservoir portion at 97° C. to 95° C. at which the liquid crystal material has shifted from the isotropic phase to the cholesteric phase. Thereafter, no distinguished flow of liquid crystals was observed from the cholesteric phase to the smectic A phase, or from the smectic A phase to the chiral smectic C phase. The thermosetting resin in the "liquid crystal reservoir" portion 51 was nearly cured in a step in which the liquid crystals were cooled from the isotropic phase to the cholesteric phase and, further, to the smectic A phase. That is, the seal portion comprising the UV-curable resin of the display portion 52 or 62 was isolated from the "liquid crystal reservoir" portion 51.

At a moment when the apparatus of FIG. 1 as a whole has reached a setpoint temperature of 40° C., the liquid crystal panel was taken out from the apparatus of FIG. 1, and how the liquid crystals have been injected was closely observed by using the CCD camera (setting the magnification to be about 90 times). As a result, quite no bubble was recognized in the display portion 52 or 62 even when the temperature of the panel has reached room temperature, and it was confirmed that the liquid crystal molecules had been very neatly disposed over the whole panel display portion 52 or 62. It was further confirmed that the liquid crystal reservoir portion and the display portion 52 or 62 had been completely sealed and isolated, and the bubbles left in the liquid crystal reservoir portion were not at all affecting the display portion 52 or 62.

In this embodiment, the time required from when the substrates for the liquid crystal panel were installed in the apparatus of FIG. 1 until the apparatus as a whole has reached 40° C. for taking out the panel from the apparatus, was a total of 96 minutes, i.e., the time required from the injection of liquid crystals until the completion in the invention was a total of 96 minutes.

Example 2

By using quite the same setup as the substrates of the liquid crystal panel used in Example 1, there was provided a seal including the liquid crystal reservoir portion. The setup of this embodiment was different from that of Example 1 with respect to setting the temperature by using a general clean oven (trade name: DES82H, manufactured by Yamato Kagakusha Co.) instead of using the apparatus (environment capable of holding the heat capacity in an amount sufficiently larger than that of the liquid crystal panel that is used) shown in FIG. 1.

In quite the same manner as in Example 1, the liquid crystal panel substrates that were prepared were installed in the clean oven capable of lowering the temperature at a rate of 1° C. a minute, and the polarization-shielding ferroelectric liquid crystals were injected in the same manner as in Example 1.

As a result, the liquid crystal material could be injected nearly favorably as viewed by naked eyes. Experience tells that use of the thus fabricated liquid crystal panel makes it possible to obtain a liquid crystal device that can be put to a practical use.

Further, the molecular orientation of liquid crystals were closely observed at room temperature by using the CCD camera (magnification is set to be about 50 times). As a result, defective orientation was locally observed on the surface of the panel (on a region of a size of about 0.08×0.04 mm calculated as the display area of the liquid crystal panel), and it was learned that the orientation was becoming non-uniform in these portion. It was further learned that the seal had been partly penetrated through (in a region of a size of about 0.5×0.3 mm) in the boundary portion between the display portion 52 or 62 and the liquid crystal reservoir portion. It was considered the panel obtained here was usable depending upon the applications.

Example 3

Figure 8A:
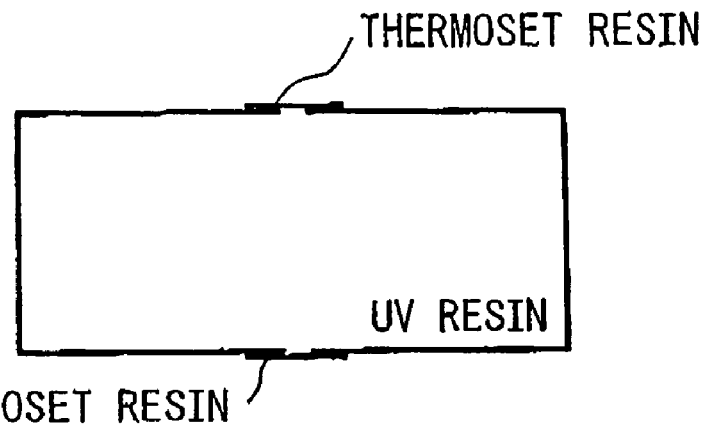
FIGS. 8A to 8C are schematic plan views illustrating another seal pattern provided with the "liquid crystal reservoir" of FIG. 6 and is capable of obtaining the effect of the invention, and a function thereof.

By using two pieces of non-alkali glass plates (trade name: 1737, manufactured by Coning Co.) measuring 200 mm×100 mm×0.7 mm t as substrates, a peripheral seal pattern shown in FIG. 8A was prepared by using a dispenser (trade name: Shotmaster 3-SL, manufactured by Musashi Engineering Co.). The seal member that was used was a UV-curable resin (trade name: 3025G, manufactured by Three-Bond Co.). Further, the seal portion of the "liquid crystal escape" portion 82 of FIG. 8A were prepared by using a thermosetting resin (trade name: 3026E, manufactured by Three-Bond Co.).

The seal member prepared on one glass substrate of the two pieces of substrates possessed a width (at both the seal portion 81 and the liquid crystal escape portion 82) of 0.2 mm and an average height of 0.04 mm. Further, the liquid crystal escape portion 82 were measured to be about 4 mm vertically and about 70 mm laterally.

Silica balls having an average particle size of 1.8 μm (trade name: Shinshikyu, manufactured by Shokubai Kasei Kogyo Co.) were dispersed in the IPA, and the mixture thereof was sprayed onto the other glass substrate of the two pieces of substrates by using a spin coater (trade name: Tokuchuhin, manufactured by Mikasa Co.). In this case, the mixture was so sprayed that the silica balls were nearly uniformly disposed at a density of about 100 balls/mm$^2$ on the region of 272.0 mm×172.0 mm on the glass substrate.

Figure 8B:
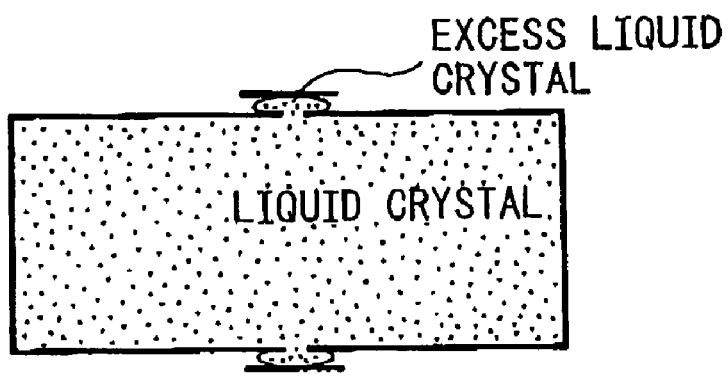
Figure 8C:
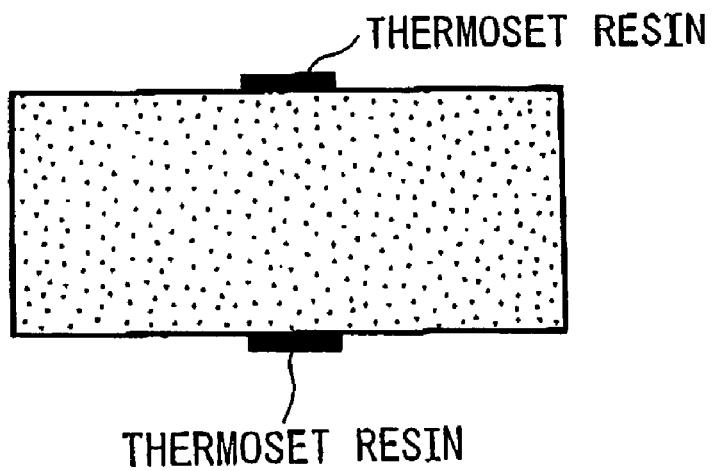

In the case of FIG. 8 which uses the thermosetting resin, the bank seal of the peripheral seal-hole portion of FIG. 8A is crushed by the pressure from the substrates when the opposing substrates are overlapped, and is widened. When the bank seal is widened, the hole portion of the peripheral seal are closed (i.e., the shape of the seal (bank portion) greatly changes; i.e., the bank seal portion that is crushed causes a relatively large change in the volume of the seal).

Next, the liquid crystal material was disposed by the same method as that of Example 1.

Thereafter, a substrate was placed on a heat sink made of a silicone rubber of which the constitution is shown in FIG. 1, its temperature was set to be 106° C. and, after one hour has passed, the other substrate (substrate on which the silica balls were disposed) was stuck thereto.

Next, the UV-curable resin constituting the peripheral seal pattern on the glass substrate was cured under the same conditions as in Example 1.

In the apparatus of FIG. 1, a sufficiently stable temperature was reached in about 25 minutes from room temperature through up to a setpoint temperature of 106° C. After the two pieces of substrates were attached to each other, the apparatus of FIG. 1 was set to be gradually cooled at a rate of 1° C. a minute.

As a result of carefully observing the liquid crystal escape portion of the seal pattern of FIG. 8 by using a CCD camera (magnification of about 50 times) that is set in the apparatus as shown in FIG. 1 like in Example 1, a remarkable flow of liquid crystals was observed between the display portion 52 or 62 and the liquid crystal escape portion at 97° C. to 95° C. at which the liquid crystal material has shifted from the isotropic phase to the cholesteric phase. Thereafter, no distinguished flow of liquid crystals was observed from the cholesteric phase to the smectic A phase, or from the smectic A phase to the chiral smectic C phase. The thermosetting resin in the "liquid crystal escape" portion 61 was nearly cured in a step in which the liquid crystals were cooled from the isotropic phase to the cholesteric phase and, further, to the smectic A phase, and was isolated from the seal portion comprising the UV-curable resin of the display portion 52 or 62.

At a moment when the apparatus of FIG. 1 as a whole has reached a setpoint temperature of 40° C., the liquid crystal panel was taken out from the apparatus of FIG. 1, and how the liquid crystals have been injected was closely observed. As a result, quite no bubble was recognized in the display portion 52 or 62 even when the temperature of the panel has reached room temperature, and it was confirmed that the liquid crystal molecules had been very neatly disposed over the whole panel display portion 52 or 62. It was further confirmed that the liquid crystal escape portion and the display portion 52 or 62 had been completely sealed and isolated, and the bubbles left in the liquid crystal escape portion were not at all affecting the display portion 52 or 62.

In this embodiment, the time required from when the substrates for the liquid crystal panel were installed in the apparatus of FIG. 1 until the apparatus as a whole has reached 40° C. for taking out the panel from the apparatus, was a total of 96 minutes, i.e., the time required from the injection of liquid crystals until the completion in the invention was a total of 96 minutes.

Comparative Example 1

By using quite the same setup as the substrates of the liquid crystal panel used in Example 3, there was provided a seal without including the liquid crystal escape portion. The setup of this Comparative Example was different from that of Example 2 with respect to that the polarization-shielding ferroelectric liquid crystals were injected by using a generally employed seal pattern (shown in FIG. 9) instead of using a seal pattern having liquid crystal escape portion shown in FIGS. 7 and 8 or liquid crystal reservoir portion employed in Example 1. In this Comparative Example, the temperature is controlled by using a heat source having a sufficiently large heat capacity shown in FIG. 1.

The liquid crystal panel substrates that were prepared in quite the same manner as in Example 3 were installed in the liquid crystal injection apparatus capable of lowering the temperature at a rate of 1° C. a minute shown in FIG. 1, and the polarization-shielding ferroelectric liquid crystals were injected in the same manner as in Example 3. As a result of observation of molecular orientation of the liquid crystals at room temperature, evolution of bubbles was observed though it was only local and very small on the inner surface of the panel.

Experience tells that use of the thus fabricated liquid crystal panel offers only those liquid crystal devices that cannot be put into practical use.

Example 4

By using two pieces of non-alkali glass (trade name: 1737, manufactured by Coning Co.) measuring 300 mm×200 mm×0.7 mm t (thick) as substrates, a peripheral seal pattern shown in FIG. 7A was prepared by using a dispenser (trade name: Shotmaster 3S, manufactured by Musashi Engineering Co.). The seal member that was used was a UV-curable resin (trade name: 3025G, manufactured by Three-Bond Co.).

Further, the seal portion of the "liquid crystal reservoir" portion of FIG. 7A were prepared by using a thermosetting resin (trade name: 3026E, manufactured by Three-Bond Co.).

The seal member prepared on one glass substrate of the two pieces of substrates possessed a width (at both the seal portion 71 and the liquid crystal reservoir portion 72) of 0.2 mm and an average height of 0.04 mm. Further, the liquid crystal reservoir portion 72 were measured to be about 10 mm vertically and about 80 mm laterally.

Silica balls having an average particle size of 1.8 μm (trade name: Shinshikyu, manufactured by Shokubai Kasei Kogyo Co.) were dispersed in an IPA (concentration of about 0.06% by mass), and the mixture thereof was sprayed onto the other glass substrate of the two pieces of substrates by using a spin coater (trade name: Tokuchuhin, manufactured by Mikasa Co.). In this case, the mixture was so sprayed that the silica balls were nearly uniformly disposed at a density of about 100 balls/mm$^2$ on the region of 272.0 mm×172.0 mm on the glass substrate (concerning the details of the method of spraying the silica balls on the glass substrate, reference can be made, for example, to the literature "Latest Technology of High-Molecular Fine Particles and Expansion of Use", S. Omi, T, Sato, S. Kawase, CMC Co., Tokyo, 1997).

First, the two pieces of substrates prepared above were attached to each other (preliminary experiment) in order to make sure the final width of the seal width when the panel was fabricated by using the seal pattern. As a result, the seal width was 4.02 mm on the average. The cell gap was 2.0 μm on the average. From the above results, the volume of when the panel was attached to each other became 272.0×172.0×0.002 mm$^2$=93.568 mm$^3$.

The polarization-shielding smectic liquid crystal material (developed by Nanoroa Co.) used in the present invention possessed a specific gravity at room temperature of 1.08. The liquid crystal material assumes the form of a wax at room temperature and could be weighed by weight instead of weighed by volume that is done by the customary ODF method. The weighing by weight is more precise than the weighing by volume by hundreds to thousands of times. By taking the liquid crystal reservoir portion into consideration, the weight of the liquid crystals dropping onto the panel was regarded to be 102.053 mg (which can be converted into a volume of 102.053 mg÷1.08=94.49 mm$^3$) at room temperature. The weight of the liquid crystal material at this moment was measured by using a precise balance (trade name: AX26DR, manufactured by Metler Co.).

Namely, in this embodiment, instead of measuring the volume of the liquid crystal material itself, the volume calculated from the weight is used as an index that represents the amount of injection of the liquid crystal material. Therefore, the amount of injection of the liquid crystal material becomes about 101% of the volume of the space A and about 100.5% of the volume of (space A+space B) based on the following numerical values.

Space A (volume of liquid crystal display portion 52 or 62)=93.568 mm$^3$.

Space B (volume of the liquid crystal reservoir portion) =1.404 mm$^3$.

Next, the peripheral seal pattern provided on the glass substrate really used for forming the liquid crystal panel, was partially cured. The false-curing conditions were as follows:
<False-Curing Conditions>
UV-irradiation condition: UV 365 nm, 4,300 mJ/cm$^3$ Here, a photo-mask was placed on the resin of the "liquid crystal reservoir" portion 51 of FIG. 8 so that these portion were not irradiated with the ultraviolet rays at the time of false-curing the peripheral seal.

Next, the liquid crystal material was disposed. That is, the liquid crystal material of the above weight (102.053 mg) was divided into four, and was dropped onto the substrate forming the seal pattern maintaining nearly an equal distance (in a manner that four dropped masses were formed maintaining distances of 90 mm in the transverse direction and 60 mm in the longitudinal direction among the masses).

Thereafter, a substrate was placed on a heat sink made of a silicone rubber of which the constitution is shown in FIG. 1, its temperature was set to be 106° C. and, after one hour has passed, the other substrate was stuck thereto. In the apparatus of FIG. 1, a sufficiently stable temperature was reached in about 25 minutes from room temperature through up to a setpoint temperature of 106° C. After the two pieces of substrates were attached to each other, the apparatus of FIG. 1 was set to be gradually cooled at a rate of 1° C. a minute. As a result of carefully observing the liquid crystal reservoir portion of the seal pattern of FIG. 7 by using a CCD camera (magnification of about 50 times) that is set in the apparatus, a remarkable flow of liquid crystals was observed between the display portion 52 or 62 and the liquid crystal reservoir portion at 97° C. to 95° C. at which the liquid crystal material has shifted from the isotropic phase to the cholesteric phase, Thereafter, no distinguished flow of liquid crystals was observed from the cholesteric phase to the smectic A phase, or from the smectic A phase to the chiral smectic C phase.

At a moment when the temperature became 70° C., a photo-mask was placed on the whole surfaces except the "liquid crystal reservoir" portion 51, followed by the irradiation with the ultraviolet rays to cure the seal of the "liquid crystal reservoir" portion 51. Due to this processing, the thermosetting resin of the "liquid crystal reservoir" portion 51 was nearly cured and was isolated from the seal portion comprising the UV-curable resin of the display portion 52 or 62. The curing conditions employed here were as follows:
<Curing Conditions>
UV: 365 nm, 2,200 mJ/cm$^3$ At a moment when the apparatus of FIG. 1 as a whole has reached a setpoint temperature of 40° C., the liquid crystal panel was taken out from the apparatus of FIG. 1, and how the liquid crystals have been injected was closely observed. As a result, quite no bubble was recognized in the display portion 52 or 62 even when the temperature of the panel has reached room temperature, and it was confirmed that the liquid crystal molecules had been very neatly disposed over the whole panel display portion 52 or 62. It was further confirmed that the liquid crystal reservoir portion and the display portion 52 or 62 had been completely sealed and isolated, and the bubbles left in the liquid crystal reservoir portion were not at all affecting the display portion 52 or 62.

In this embodiment, the time required from when the substrates for the liquid crystal panel were installed in the apparatus of FIG. 1 until the apparatus as a whole has reached 40° C. for taking out the panel from the apparatus inclusive of the time for curing the "liquid crystal reservoir" portion 51 with UV, was a total of 105 minutes, i.e., the time required from the injection of liquid crystals until the completion in the invention was a total of 105 minutes.

As described above, the present invention makes it possible to effectively and reliably inject the liquid crystals that could not be so far injected at room temperature, such as smectic liquid crystals. Therefore, the present invention markedly improves the throughput and reliability in the process in mass-producing large panels.

Thus, the present invention makes it possible to highly efficiently mass-produce large LCDs using smectic liquid crystals which, so far, could not be easily produced.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A method of injecting a liquid crystal material, comprising:

disposing a liquid crystal material on a first substrate;

disposing a second substrate above the first substrate; and attaching the first substrate and the second substrate to obtain a pair of substrates, wherein, at the time of the attachment, a space B is formed so that the space B communicates with a space A defining an area for a liquid crystal display, the space A being defined by sides of the pair of substrates, and the spaces A and B collectively forming a closed space;

the spaces A and B are defined by a patterned seal member disposed on the first substrate, the second substrate or on the first and second substrates;

the volume of the space B is based on a volume change between a total volume of the spaces A and B at 25 ° C. and a total volume of the spaces A and B at 100 ° C. as determined based on the thermal expansion coefficients of the liquid crystal material and the seal member at 100 ° C. and 25 ° C.;

the liquid crystal material that is disposed on the first substrate has a volume not larger than the total volume of the spaces A and B at the time of disposing the liquid crystal material; and the liquid crystal material is heated prior to being disposed between the pair of substrates, and the temperature of the liquid crystal material is lowered thereafter.

2. A method of injecting a liquid crystal material according to claim 1, wherein the spaces A and B are isolated from each other after the pair of substrates are attached to each other.

3. A method of injecting a liquid crystal material according to claim 1, wherein the temperature at the time of the injection of the liquid crystal material is higher than 25 ° C.

4. A method of injecting a liquid crystal material according to claim 1, wherein the temperature at the time of the injection of the liquid crystal material is not lower than 100 ° C.

5. A method of injecting a liquid crystal material according to claim 1, wherein the liquid crystal material is heated to show an isotropic phase so as to be disposed between the pairs of substrates.

6. A method of injecting a liquid crystal material according to claim 1, wherein, in the seal pattern, a seal portion corresponding to the space A and a seal portion corresponding to the space B comprise seal members having different curing mechanisms.

7. A method of injecting a liquid crystal material according to claim 6, wherein the seal portion corresponding to the space A comprises a UV-curable seal member, and the seal portion corresponding to the space B comprises a thermosetting seal member.

8. A method of injecting a liquid crystal material according to claim 1, wherein the percent change in the volume between the total volume of the spaces A and B at 25 ° C. and the total volume of the spaces A and B at 100 ° C. over the total volume of the spaces A and B at 25 ° C. ranges between −15% and +15%.

* * * * *